US012056516B2

(12) United States Patent
Virtuoso et al.

(10) Patent No.: US 12,056,516 B2
(45) Date of Patent: Aug. 6, 2024

(54) DISTRIBUTED DATA PROCESSING APPLICATION SERVICE IN A PROVIDER NETWORK

(71) Applicant: Amazon Technologies, Inc., Seattle, WA (US)

(72) Inventors: Anthony A. Virtuoso, Seattle, WA (US); Eric Mills, Seattle, WA (US); Bijay Singh Bisht, Seattle, WA (US); Santosh Chandrachood, Seattle, WA (US); Mehul A. Shah, Seattle, WA (US); Wesley Blumenthal, Seattle, WA (US); Linchi Zhang, Seattle, WA (US); Rahul Pathak, Seattle, WA (US); Matt Bachman, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 476 days.

(21) Appl. No.: 17/491,296

(22) Filed: Sep. 30, 2021

(65) Prior Publication Data

US 2023/0099186 A1  Mar. 30, 2023

(51) Int. Cl.
*G06F 9/44* (2018.01)
*G06F 9/455* (2018.01)

(52) U.S. Cl.
CPC .. *G06F 9/45558* (2013.01); *G06F 2009/4557* (2013.01); *G06F 2009/45575* (2013.01); *G06F 2009/45595* (2013.01)

(58) Field of Classification Search
CPC .................................................. G06F 9/45558

USPC ............................................................. 718/1
See application file for complete search history.

(56) References Cited

U.S. PATENT DOCUMENTS

| 8,862,633 | B2* | 10/2014 | Friedman .................. G06F 8/63 |
| | | | 718/1 |
| 8,966,082 | B2 | 2/2015 | Chaturvedi et al. |
| 9,612,815 | B1* | 4/2017 | Jagtap ....................... G06F 8/61 |
| 10,509,688 | B1 | 12/2019 | Zelenov et al. |
| 2020/0379818 | A1* | 12/2020 | Kiraly ................... G06F 9/5072 |
| 2021/0058388 | A1 | 2/2021 | Knotwell et al. |
| 2022/0030023 | A1* | 1/2022 | Soman ..................... G06F 21/53 |

OTHER PUBLICATIONS

Hinden, et al., "Unique Local IPv6 Unicast Addresses", Network Working Group, Request for Comments: 4193, Oct. 2005, 16 pages.

(Continued)

*Primary Examiner* — Timothy A Mudrick
(74) *Attorney, Agent, or Firm* — Nicholson DeVos Webster & Elliott LLP

(57) ABSTRACT

Techniques for a distributed data processing application service in a cloud provider network are described. A virtual machine bundle is obtained, the virtual machine bundle including a copy of a memory and one or more registers of a paused virtual machine executing a distributed data processing application runtime. A request to launch a virtual machine to execute a distributed data processing application runtime is received, the request to launch the virtual machine including a bundle identifier that identifies the virtual machine bundle. The virtual machine is launched based at least in part on the virtual machine bundle. The virtual machine sends a message to register the virtual machine with a cluster of virtual machines.

20 Claims, 14 Drawing Sheets

(56) References Cited

OTHER PUBLICATIONS

Rekhter, et al., "Address Allocation for Private Internets", Network Working Group, Request for Comments: 1918, Feb. 1996, 9 pages.
International Search Report and Written Opinion, PCT App. No. PCT/US2022/045064, Dec. 15, 2022, 10 pages.
Vmware: "Suspend and Resume a Virtual Machine", May 31, 2019 (May 31, 2019), pp. 1-360, XP93005365.

* cited by examiner

DISTRIBUTED DATA PROCESSING APPLICATION SERVICE IN A PROVIDER NETWORK

BACKGROUND

Various distributed data processing applications or tools allow users to accomplish computationally demanding tasks. To accomplish such tasks within a reasonable amount of time, such applications typically take a "divide and conquer" approach by breaking a task down into smaller pieces of work and distributing those pieces across a cluster of computer systems.

BRIEF DESCRIPTION OF DRAWINGS

Various embodiments in accordance with the present disclosure will be described with reference to the following drawings.

DETAILED DESCRIPTION

Figure 1:
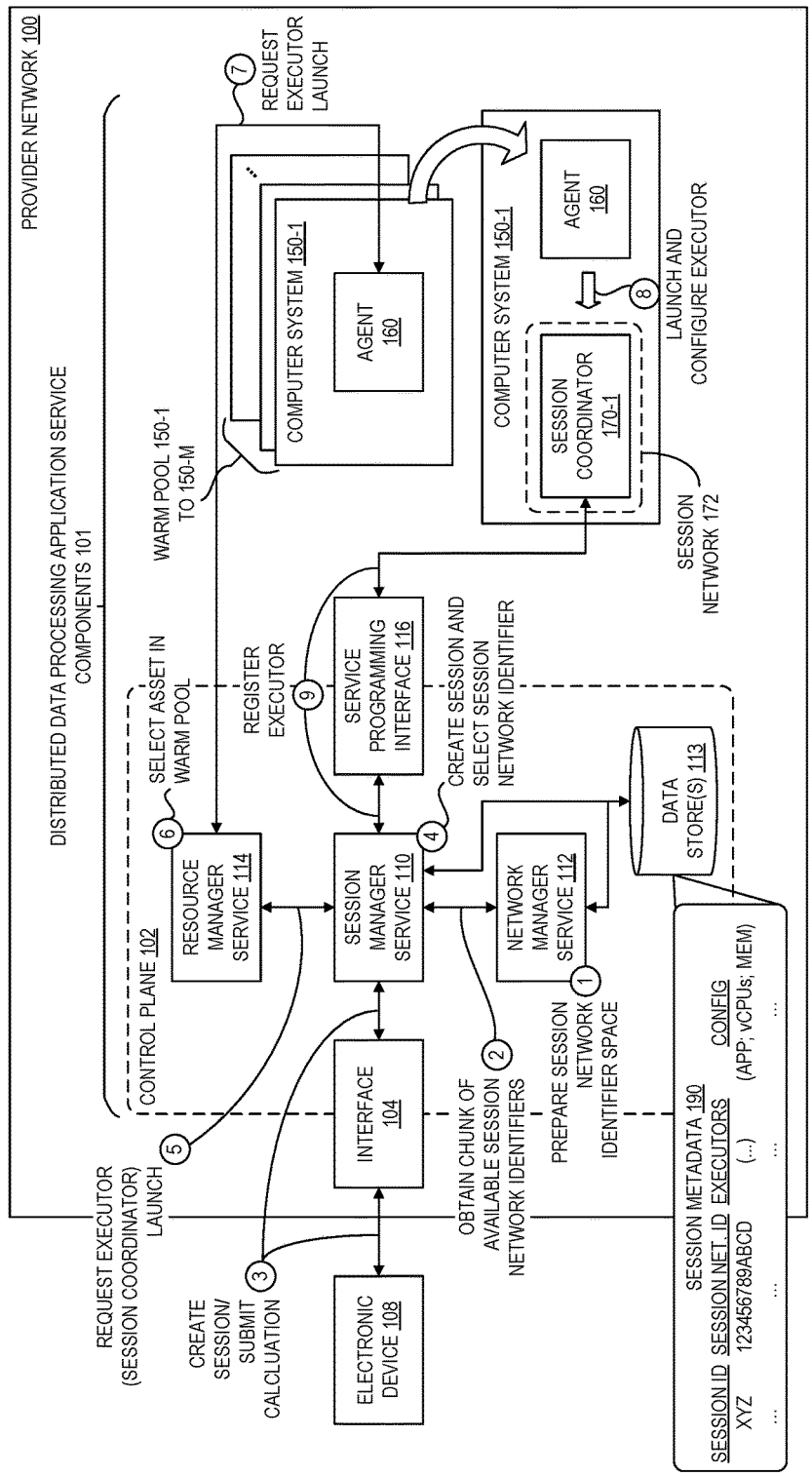
FIG. 1 is a diagram illustrating a cloud provider network environment including a distributed data processing application service that enables the rapid creation of computing clusters according to some embodiments.

The present disclosure relates to methods, apparatus, systems, and non-transitory computer-readable storage media for a distributed data processing application service in a cloud provider network. The distributed data processing application service described herein provides users with a rapidly scaling computing cluster on which to execute a computational task. The cluster members are hosted within virtual environments, and the number of members in a cluster can range from a handful to thousands (or more). Embodiments described herein enable the distributed data processing application service to rapidly add new members to a cluster.

Distributed data processing applications allow users to accomplish computationally demanding tasks. To do so within a reasonable amount of time, such applications take a "divide and conquer" approach by breaking a task down into smaller pieces of work and distributing those pieces across a cluster of computer systems. Distributed data processing applications (or distributed applications) include analytics and database applications such as Spark, Hadoop, and Presto, to name a few. Existing cloud-based distributed applications services typically require someone to manage the cluster across which the applications run. Such management activities often fall on information technology administrators or the application developers and include increasing and decreasing server capacity, tuning cryptic settings, and managing software updates. Even experienced administrators or users can find properly tuning clusters in advance to be challenging due to hard to predict factors such as application complexity, application data models, and usage fluctuations of machines within the cluster depending on the time of day or day of the week. As a result, cluster management often presents a trade-off of either over-provisioning resources to improve the cluster's responsiveness at an increased cost or starting clusters on-demand for a reduced cost but delayed cluster responsiveness.

One of the contributors to the delayed cluster responsiveness associated with on-demand management strategies is the need for cluster members to communicate with one another. The latency cost of existing techniques to create and maintain a cluster network within a cloud provider network. Such techniques include operations with a control plane of the provider network, including creating or modifying a dedicated virtual private cloud, subnets, and security groups. The total delay using such techniques can be significant, often amounting to 8-10 seconds or more. As a result, for a task running across ten members that would otherwise have a one-minute runtime on an existing cluster, the overall runtime would more than double on a newly formed cluster if the addition of each member took 8-10 seconds.

Additionally, many tasks performed by distributed data processing applications are short-lived. That is, the cluster can accomplish them in a short amount of time—often within a minute or two. Clusters are often used to support many such tasks but often with the potential for significant idle time between submissions. Consequently, the overall cost of maintaining the cluster is high relative to its usage time.

The distributed data processing application service disclosed herein eliminates many of these trade-offs by allowing users to run distributed data processing applications cost effectively without the hassle of managing server capacity, tuning cryptic settings, managing software updates, or any of the other chores associated with managing cluster infrastructure. In particular, the architecture and approach of the distributed data processing application service described herein leverages several techniques to allow the rapid launch of cluster members and creation of isolated networks for cluster members to communicate while also scaling to allow the handling of a high volume of customer requests (e.g., forming 1000s of networks per second). The distributed data processing application service largely hides the creation and configuration of a cluster for a task from the user, making it easy for data analysts and application developers to run interactive, large scale distributed data processing applications without the need to plan for, setup, tune, and manage clusters.

One aspect of the present disclosure that facilitates the rapid creation of clusters is the absence of the need to keep a global state in the launch flow for adding new members to a cluster. Calls between entities in the launch path are generally local and one-directional in that the issuing entity does not need to check any global state of the cluster into which a new member is being added or of other clusters and, further, does not wait on the recipient to confirm successful completion of the requested operation. In doing so, delays such as those that arise when there is contention amongst multiple entities for a global state resource are avoided.

Another aspect of the present disclosure that facilitate the rapid creation of clusters is the "pre-warmed" virtual machine bundles for particular data processing applications (also referred to as data processing tools). As described in further detail below, cluster members are hosted in virtualized environments (e.g., the distributed data processing application software is executed by a virtual machine). A virtual machine bundle refers to a grouping of software, virtual machine configuration, and virtual machine state from which to launch a virtual machine to host a cluster member. To pre-warm a bundle, a virtual machine is launched including the beginning stages of the execution of the distributed data processing tool runtime (e.g., Spark, Hadoop, Presto, etc.) to a point prior to where a customer's calculation would begin. The virtual machine is paused at this penultimate state and a copy of the virtual machine's memory and processor registers is taken to be included in the bundle. Future virtual machines launched to host a member of a compute cluster are resumed using this bundle, thereby eliminating a significant portion of the startup time that would otherwise be present were the virtual machine and associated data processing tool runtime launched without the pre-warmed bundle.

Another aspect of the present disclosure that facilitates the rapid creation of clusters is the use of the 128-bit address space of IPv6 (Internet Protocol version 6) to create session networks for clusters to securely communicate. The distributed data processing application service leverages this space to embed information in addresses that can be used isolate individual networks supporting different clusters from one another. In particular, the distributed data processing application service uses a portion of the address space to embed a distinct network identifier (also referred to as a session network identifier) that uniquely identifies a cluster and permits the restriction of traffic to individual clusters. The networking techniques described herein permit the addition or removal of cluster members from a session network. The session network identifier determines a portion of the IPv6 address to be assigned to the individual cluster members. Such computer systems are also referred to as "bare metal" or simply "metal" systems. This delegation allows the metal systems to allocate IPv6 addresses to cluster members and configure access to the cluster network without updating networking configuration data of the other existing members and typically without involving the cloud provider network control plane, thereby reducing potential bottlenecks in network configuration.

FIG. 1 is a diagram illustrating a cloud provider network environment including a distributed data processing application service that enables the rapid creation of computing clusters according to some embodiments. The components 101 of a distributed data processing application service are hosted within a provider network 100. The provider network 100 (or "cloud" provider network) provides users with the ability to use one or more of a variety of types of computing-related resources. For example, a cloud provider network (or just "cloud") typically refers to a large pool of accessible virtualized computing resources (such as compute, storage, and networking resources, applications, and services). Exemplary computing-related resources include compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The provider network 100 can span multiple geographic regions and can, in certain instances, even control or provide access to resources that are outside of the provider network such as edge locations, on-premises locations, etc.

To provide these and other computing resource services, provider networks 100 often rely upon virtualization techniques. For example, virtualization technologies can provide users the ability to control or use compute resources (e.g., a "compute instance," such as a VM using a guest operating system (0/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. As part of "launching" a virtualized resource such as a compute instance or virtual machine, the underlying host computer system allocates some portion of its memory and compute resources to that virtualized resource. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

The users (or "customers") of provider network 100 can use one or more user accounts that are associated with a customer account, though these terms can be used somewhat interchangeably depending upon the context of use. Users can interact with a provider network 100 across one or more intermediate networks (e.g., the internet) via one or more interface(s) 104, such as through use of application programming interface (API) calls, via a console implemented as a website or application, etc. In this manner, a cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) 104 can be part of, or serve as a front-end to, a control plane 102 of the provider network 100 that includes "backend" services supporting and enabling the services that can be more directly offered to customers.

In the case of the distributed data processing application service, the interface 104 provides a set of customer-facing APIs to facilitate the submission of calculations to the distributed data processing application service and either the implicit or explicit creation of sessions to execute calculations while isolating the distributed data processing application service from external networks (e.g., the internet). As used herein, a "session" is a logical entity of the distributed data processing application service that can be used to track a cluster of one or more executors (or, more generally, members) and customer-submitted calculations executed by the cluster. Customers submit "calculations" for processing by a session. In this context, a calculation refers to the customer code to be executed by a cluster (e.g., Spark Scala code, SQL queries, etc.).

The distributed data processing application service can provide several types of sessions including interactive sessions, standalone sessions, and custom sessions. Interactive sessions are geared towards notebook use cases and facilitate the stateful nature of such sessions. Standalone sessions require no explicit lifecycle management by the customer. They are created automatically for a single calculation submission and stop once that calculation reaches its logical conclusion. Custom sessions are explicitly created using customer-issued start and stop commands to support use cases such as a customer's own long-lived application.

Executors (or members of a cluster) are individual computing units that can be added to and/or removed from a cluster. Executors are implemented using virtualization technologies such as virtual machines and include the application runtime for the specific distributed data processing application being supported (e.g., Spark, Presto, etc.). In some embodiments, executors are implemented as lightweight "microVMs" running specific software and having a particular configuration. A microVM, as used herein, typically refers to a VM initialized with a limited device model and/or with a minimal OS kernel that is supported by the lightweight virtual machine manager (VMM), and which can have a low memory overhead of <5 MiB per microVM such that thousands of microVMs can be packed onto a single host. For example, a microVM can have a stripped-down version of an OS kernel (e.g., having only the required OS components and their dependencies) to minimize boot time and memory footprint. In one implementation, each process of the lightweight VMM encapsulates one and only one microVM. The process can run the following threads: API, VMM and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core).

The subsequent description of the distributed data processing application service generally refers to virtual machines, although other virtualization technologies such as microVMs, containers, or other technologies may be used. Additionally, the size of an executor may vary in multiples of data processing units ("DPUs"). For example, a DPU might represent 4 virtual CPUs and 16 gigabytes of memory.

A special type of executor is the "session coordinator." The session coordinator is an executor that is responsible for divvying up the work associated with a task across the cluster. To use Spark as an example, a session coordinator executor would correspond to a Spark driver. It is the responsibility of the session coordinator(s) to add/remove other executors to the session as well as to execute the calculations that are submitted to it via distributed data processing application service.

The components 101 of the distributed data processing application service include a session manager service 110, a network manager service 112, and a resource manager service 114 that work together to form clusters in response to user requests via the interface 104 and to automatically scale clusters up or down based to facilitate the execution of a distributed data processing application. The cluster associated with a given session operates within isolated network which only allows executors participating in the same session (a.k.a. peers) to freely communicate and blocks communication to/from entities which are not part of the session. This isolated network is referred to as the "session network."

The executors (e.g., cluster members) that are part of sessions are hosted by computer systems 150 selected from a warm pool of assets for the distributed data processing application service that are ready to launch executors for sessions. For example, the warm pool may include computer systems 150-1 through 150-M (also referred to as assets or metals), where M represents the number of assets in the pool (e.g., hundreds, thousands or more). A capacity manager service (not shown) can dynamically adjust M by either requesting additional assets from a hardware virtualization service (when demand is high) or freeing assets from the warm pool to the hardware virtualization service (when demand is low). Additional details regarding computer systems 150 are described below with reference to FIG. 7.

Collectively, the session manager service 110, the network manager service 112, and the resource manager service 114 may be treated as "micro-services" that together make up the distributed data processing application service. Each of these micro-services maybe itself be a distributed service. That is, each distributed micro-service may be comprised of multiple components that are accessible behind a load balancer that distributes requests directed to the micro-service. To rapidly create session networks, the dependencies of these micro-services on other services and, in the distributed case, the intra-dependence amongst entities of a micro-service are minimized as described herein.

The network manager service 112 vends session network identifiers while ensuring that there are never two active sessions with the same identifier. Session network identifiers are used to derive the IPv6 addresses for the virtual machines supporting executors. Using the session network identifier, individual sessions networks can be easily (and quickly) created to isolate traffic amongst the executors in a particular cluster using associated firewall rules.

The session manager service 110 acts as the orchestrator of session, calculation, and executor lifecycles. In some embodiments, the session manager service 110 tracks these entities as well as their relationships (e.g., which executors are part of a given session) in session metadata stored in a data store 113. To avoid having these tracking operations interfere with the speed at which clusters can launch and resize, fine-grained orchestration of the session (e.g., adding and removing executors) is delegated to the application runtime. When the application runtime executing on a session coordinator wants to scale up or down a session, the session manager service 110 acts as a bridge to the resource manager service 114, described below.

The resource manager service 114 abstracts the warm pool of assets (e.g., 150-1 through 150-M) from requestors of virtual machines. The resource manager service 114 makes placement decisions—that is, it selects which asset in the warm pool on which to attempt to launch new virtual machines for hosting requested executors. In some embodiments, the resource manager service 114 is implemented as a fully in-memory architecture with minimal external dependencies.

In some embodiments, the resource manager service 114 is part of a hardware virtualization service. Such a hardware virtualization service (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

The service programming interface 116 vends an API that application runtime developers (e.g., Spark or other distributed data processing application developers) will use to integrate with functionality provided by the distributed data processing application service. Like the interface 104 isolates the distributed data processing application service from external networks, the service programming interface 116 isolates the session manager service 110 (and other non-customer specific components of the distributed data processing application service) from session networks as third-party software is being executed within those environments. Exemplary API requests vended by the service programming interface 116 include requests to register a newly launched executor with a session, increase or decrease the number of executors in a session network, obtain recommended settings for a given logical plan from a recommendations service (not shown), and perform a new calculation (e.g., for interactive sessions).

The high-level flow of the launch of the first executor—or session coordinator—for a session is described with reference to the circled numbers 1 through 9. At circle 1, the network manager service 112 prepares the session network identifier space. As alluded to above, the session network identifiers define how the session network for the session is configured. In particular, the session network identifier is used to form a portion of the IPv6 address later assigned to virtual machines hosting executors. For example, a 52-bit session network identifier allows for over a quadrillion combinations. To efficiently allocate session network identifiers while avoiding conflicts, the network manager service 112 may divide the space into smaller sets of identifiers. For example, the network manager service 112 may divide the combinations into sets of 1,024 session network identifiers. Such sets can be allocated to the session manager service 110 when creating a new session. Additionally, to provide some degree of obfuscation of the session network identifier assignment (to delay a would-be attacker from compromising session networks), the network manager service 112 may shuffle the session network identifier prior to or as part of dividing the session network identifier space into sets (also referred to as chunks of session network identifiers).

Because the number of chunks of session network identifiers can be large and the session manager service 110 may be a distributed service issuing multiple requests for chunks, the network manager service 112 may further generate a data structure to track which of the chunks have been allocated. The network manager service 112 can use this chunk tracking metadata to ensure that it does not provide the same chunk twice.

The network manager service 112 can store the prepared chunks and tracking data (also referred to as chunk metadata) in a data store 113, which may be provided by another service of the provider network. Additional details on the shuffling and chunking operations and the chunk tracking operations of the network manager service 112 are described below with reference to FIG. 4.

By preparing the chunks of session network identifiers and allocating those chunks to the session manager service 110 (or, if distributed, each of the distributed session manager service components), the network manager service 112 need not be part of the launch flow path for new executors. As a result, the launch time for executors is reduced.

At circle 2, the session manager service 110 issues a request to the network manager service 112 to allocate one or more chunks of session network identifiers. The network manager service 112 returns a chunk of session network identifiers that were previously prepared by the network manager service 110. Additionally, the network manager service 112 marks the allocated chunk of session network identifiers as used in the chunk tracking metadata to prevent its re-use in a later allocation request from the session manager service 110.

At this stage, the session manager service 110 has one or more allocated chunks of session network identifiers that it can use when creating clusters in response to customer requests and in service of customer calculations. The session manager service 110 can store the allocated chunk(s) of session network identifiers in a local memory (not shown) such that when a request to create a session or run a calculation is received, the session manager service 110 can locally perform the operation of selecting an unused session network identifier without issuing external network requests. In this manner, network latency can be removed from this portion of the cluster member launch path.

At circle 3, a customer submits a request to the distributed data processing application service via an electronic device 108 and the interface 104. Various types of requests are supported, with the interface 104, which is exposed to one or more intermediate networks between the electronic device 108 and the provider network 100, effectively proxying the request to the session manager service 110. For example, the customer may request that a session be created. As another example, the customer may request that a calculation be performed (which may implicitly cause a session to be created). Additional details about these initial customer-issue requests are described below with reference to FIG. 5.

In some embodiments, upon receipt of a request to run a calculation or create a session, the session manager service 110 first checks with an admission control service (not shown) to verify whether the request should be allowed to start or rejected. The admission control service may make this determination based on a number of factors, including system capacity, customer account limits, etc. Exemplary customer account limits include limits for both the rate and concurrency of sessions, calculations, executors, DPUs, etc. on the customer account.

At circle 4, the session manager service 110 creates a new session by assigning a session identifier to the session. As indicated above, a session is a logical entity that can be used to track a cluster. Additionally, the session manager service 110 selects a session network identifier from the chunk of session network identifiers it previously obtained at circle 2. At this point, the session manager service 110 can update session metadata 190 to associate the assigned session identifier with the selected session network identifier. In this example, the session identifier is XYZ and the session network identifier is 123456789ABCD. Exemplary session metadata 190 can also include, for example, an identification of each of the executors that are part of the session (if any) as well as various configuration settings. Example configuration settings include software configuration settings such as an identification of the application runtime (e.g., Spark) being executed by the cluster and hardware configuration settings (e.g., number of virtual CPUs and an amount of memory to be allocated per virtual machine) for members that may be launched into the cluster.

At circle 5, the session manager service 110 sends a request including the selected session network identifier to the resource manager service 114 to launch a new virtual machine which will become the session coordinator (first executor) in the session. At circle 6, the resource manager service 114 evaluates its inventory of assets in the warm pool and selects an asset believed to have capacity to host the requested virtual machine. At circle 7, the resource manager service 114 sends a request including the session network identifier to an agent 160 running on the selected asset 150 to launch a new virtual machine. In this example, the resource manager service 114 selects computer system 150-1. Assuming the asset has capacity to host the requested executor, the agent launches and configures the executor 170-1, in this case the session coordinator, as indicated at circle 8. Additional details on the launch and configuration of an executor are provided below with reference to FIG. 7. For now, of note, the agent 160 forms the IPv6 address assigned to the executor by combining the host address of the computer system 150-1, the session network identifier, and a local network identifier. Additionally, the agent configures a firewall between the executor and the outside world to permit communications to all other executors (if any) sharing the session network identifier. Additional details of this address form and formation are described provided below with reference to FIGS. 3, 4, and 7.

In some embodiments, the agent 160 may request a customer credential from an authentication service (not shown) prior to launching the virtual machine. A credential typically comprises a unique identifier that is associated with a secret access key, which, when used together, can be used to sign programmatic requests to services such as the session manager service 110 cryptographically. The agent 160 can load the customer credential into the virtual machine so that software executed by the virtual machine can access it. For example, software executed by the virtual machine can include the customer credential when issuing requests to services of the provider network to perform operations on behalf of the customer, such as adding additional executors to the session.

At circle 9, the now launched and running session coordinator 170-1 registers itself with the session manager service 110 via the service programming interface 116. The session manager service 110 can then update session metadata 190 to associate the newly launched session coordinator with the session. In some embodiments, executors are identified in the session metadata 190 by a network address and type. For example, the session coordinator 170-1 can be added to the session XYZ based on its network address, described in further detail below, and with an indication that it is a session coordinator (rather than a generic executor).

Data stores 113 are intended represent a variety of data storage types and locations. Session manager service 110 and network manager service 112 can each use the same or different data stores, local or remote storage, storage provided via another storage or database service of the provider network, etc.

In some embodiments, the control plane 102 further includes an executor proxy service (not shown). The executor proxy service effectively provides a path through which the session manager service 110 or other distributed data processing application service control plane 102 component can issue commands directly to an executor. For example, for an interactive session type, the customer may submit a series of calculations to the session manager service 110 via the interface 104, and the session manager service 110 can relay those calculations to a session coordinator via the executor proxy service.

A session coordinator will typically enlist the help of additional executors to carry out the work required by calculations performed by a session. The addition of executors to the session network is described with reference to FIG. 2.

Figure 2:
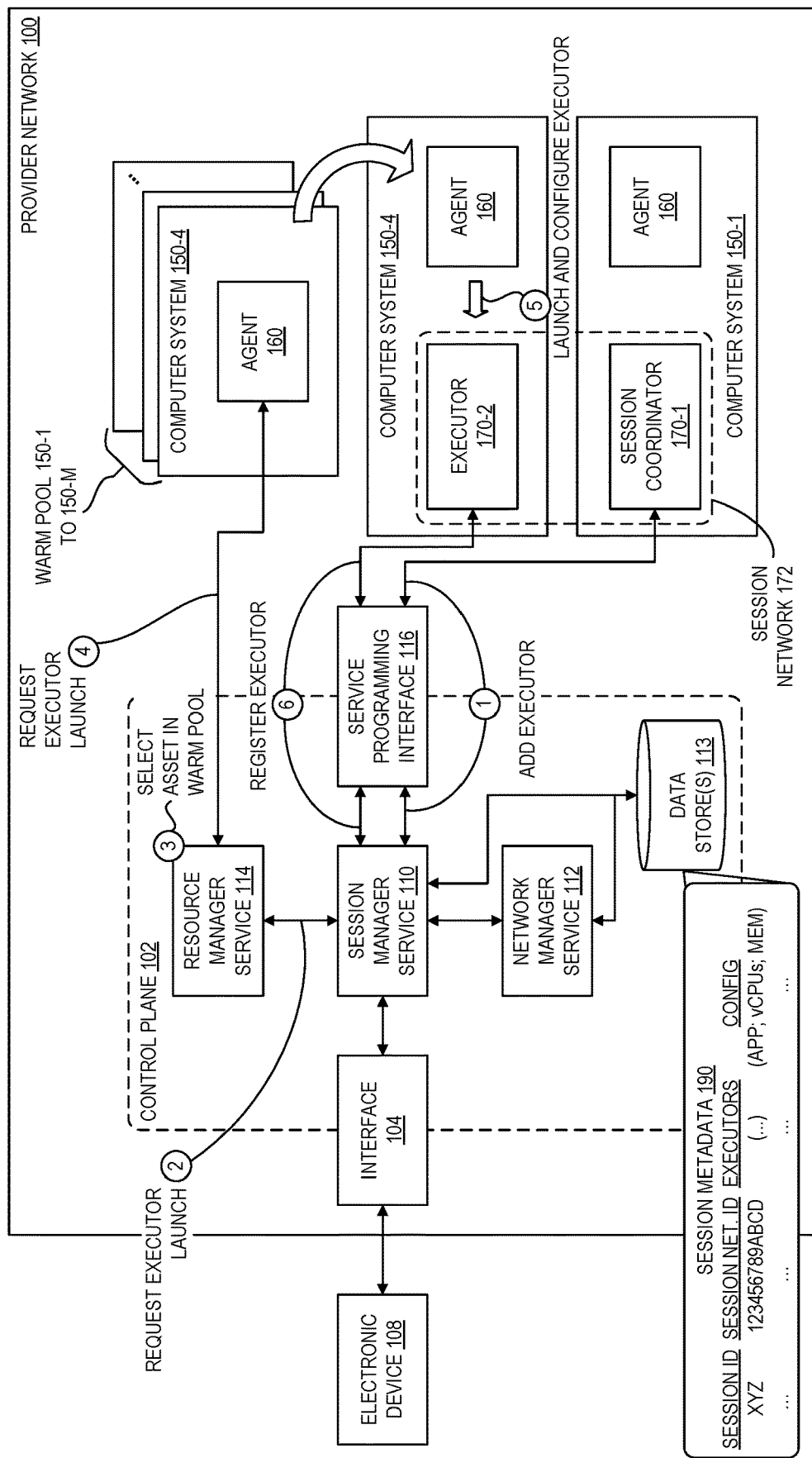
FIG. 2 is another diagram illustrating the distributed data processing application service of FIG. 1 launching a new member of a computing cluster according to some embodiments.

FIG. 2 is another diagram illustrating the distributed data processing application service of FIG. 1 launching a new member of a computing cluster according to some embodiments. Continuing from where the description of FIG. 1 left off, at circle 1, the application runtime of the session coordinator 170-1 has determined to distribute a portion of the calculation to another executor. Because no other executors have been added to the session, the session coordinator 170-1 issues a request to the session manager service 110 via the service programming interface 116 to add a new executor.

In some embodiments, the distributed data processing application service includes a recommendation service (not shown) that can provide recommended virtual machine settings for an application to a Session Coordinator (or user, if requested via the interface 104). For example, the recommendation service may be able to understand logical plans associated with the application runtime (e.g., Spark plans) and/or evaluate historical calculation performance of comparable (abstracted) calculations to recommend how many executors to use at each stage of a calculation or what size executors to use for the calculation. If such a recommendation service is available, the application developer can configure the session coordinator 170-1 to obtain a recommended hardware configuration from the recommendation service to include in the request to add a new executor.

Upon receipt of the request to add an executor from the session coordinator 170-1, the session manager service 110 can issue a request to launch a new executor to the resource manager service 114 as indicated at circle 2. At circle 3 and circle 4 of FIG. 2, the operations proceed such as described with reference to circles 6 and 7 of FIG. 1. In this case, the resource manager service 114 selects and sends a request to launch a new virtual machine to the agent 160 running on the selected asset 150-4. At circle 5, the agent 160 of computer system 150-4 launches and configures the executor 170-2. Additional details on the launch and configuration of an executor are provided below with reference to FIG. 7. The agent 160 of computer system 150-4 forms the IPv6 address to assigned to the executor by combining the host address of the computer system 150-4, the session network identifier, and a local network identifier. Additionally, the agent 160 of computer system 150-4 configures a firewall between the executor and the outside world to permit communications to all other executors (if any) sharing the same session network identifier. Because of the independent address formation and addressing scheme described herein, no modifications need be made to the configuration of the session coordinator 170-1 to enable communications with the newly launched executor 170-2.

At circle 6, the now launched and running executor 170-2 registers itself with the session manager service 110 via the service programming interface 116 such as described with reference to circle 9 of FIG. 1.

Figure 3:
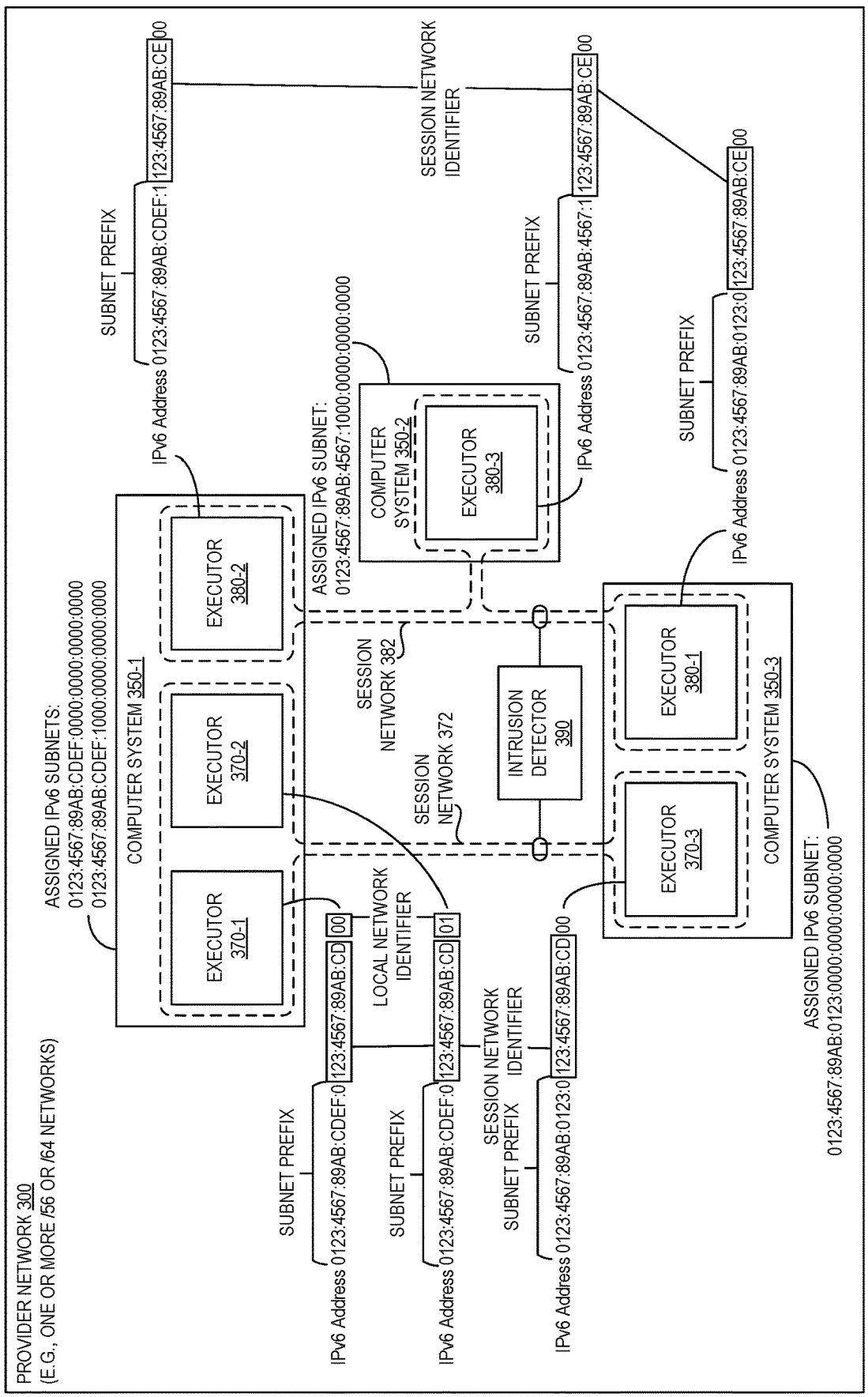
FIG. 3 illustrates an exemplary network configuration of two computing clusters launched within the cloud provider network environment according to some embodiments.

FIG. 3 illustrates an exemplary network configuration of two computing clusters launched within the cloud provider network environment according to some embodiments. The IPv6 protocol uses a 128-bit address space, which, compared to the 32-bit address space of IPv4, supports an additional ~7×10^38 addresses beyond the ~4 billion addresses of IPv4. The additional spaces drastically reduce the probability that two networks interacting that have conflicting IP ranges. In fact, the IPv6 specification, if followed by all parties, has mechanisms to completely avoid the possibility of conflicts through the assignment of subnets from internet registries.

The 128-bit address space is represented as 8 groups of 16 bits each, often written in hexadecimal form. (For comparison, IPv4 space is represented by 4 groups of 8 bits each.) The address space is divided into two halves. The first (left most) 64 bits are the routing prefix or network identifier with 64 bits being the smallest single IPv6 subnet. The second (right most) 64 bits are the interface identifier.

IPv6 address space is divided using prefixes in a format such as "fe80::/10" were the leading address identifies the fixed digits in the prefix and the number following the slash (/) identifies how many of the left most bits of the 128 bit address space are fixed. The network/routing portion of the IPv6 address range is sufficiently large and can be divided into ~1.8×10^19 "/64" subnets. This means gaining ownership of a prefix which is sufficiently large and unique is easily possible (compared to IPv4 which has only ~4 billion addresses in total).

The provider network 300 typically has a large address space assigned to it (e.g., one or more/56 or/64 network prefixes) that it can divide up amongst its components. In the distributed data processing application service, host computer systems (e.g., computer systems 150) in the warm pool shown in FIGS. 1 and 2 are delegated one or more/68 subnet prefixes. Here, a computer system 350-1 has been assigned two subnet prefixes: 123:4567:89AB:CDEF:1000::: and 123:4567:89AB:CDEF:0000::: (note that leading zeros are often omitted by convention), computer system 350-2 has been assigned one subnet prefix 123:4567:89AB:4567:1000:::, and a computer system 350-3 has been assigned one subnet prefix 123:4567:89AB:0123:0000:::. The computer system 350-1 hosts three executors 370-1, 370-2, and 380-2, the computer system 350-2 hosts one executor 380-3, and the computer system 350-3 hosts two executors 370-3 and 380-1.

As shown, the three executors 370 form a session network 372, and the three executors 380 form a session network 382, all within the provider network 300. In this example, the 128-bit executor network addresses are formed by combining a 68-bit subnet prefix assigned to a host computer system, a 52-bit session network identifier, and an 8-bit local network identifier that uniquely identifies an executor that is part of the same session network hosted on the same computer system and sharing the same subnet prefix. In this manner, the session networks are identified by a middle portion of the IPv6 address—session network 372 is identified by the 123:4567:89AB:CD portion of the IP addresses of the members of the cluster in session network 372 and session network 382 is identified by the 123:4567:89AB:CE portion of the IP addresses of the members of the cluster in session network 382.

Differences and similarities amongst the network addresses of the executors are highlighted in FIG. 3. For example, the executors 370-1 and 370-2, which are hosted on the same computer system 350-1, share the same prefix (0123:4567:89AB:CDEF:0) and the same portion of the IPv6 addresses specified by the session network identifier (123:4567:89AB:CD) while having different local network identifiers (00 vs. 01) to distinguish the executors since they are within the same subnet prefix on the same host computer system. As another example, the executors 380-1 and 380-2, which are respectively hosted on computer systems 350-3 and 350-1, share the portion of their IPv6 addresses specified by the session network identifier (123:4567:89AB:CE) while having different subnet prefixes and local network identifiers. Local network identifiers for executors in the same session hosted by different computer systems may be the same or different; the local network identifier prevents ambiguity amongst executors in the same session on the same host computer system and sharing the same subnet prefix assigned to the host computer system.

Using an addressing scheme such as the one illustrated in FIG. 3, agents configuring the launch and configuration of virtual machines can make purely local firewall policy updates in constant time without coordinating with other computer systems hosting executors that are part of the same session, if any. Furthermore, those local updates effectively add and remove executors from a session network by permitting traffic to other members of the session network. Additionally, the sheer size of the session network identifier space avoids reuse (subject to certain low frequency changes described herein) and improves traceability of events that occur on the provider network such as the possibility that a malicious or errant piece of software executed by an executor might attempt to intrude on a session network other than the one it was launched within.

An intrusion detector 390 can monitor and aggregate traffic flow logs. Such flow logs can include packet header information such as the source and destination of each packet that traverses a session network such as session networks 372 and 382. The intrusion detector 390 can analyze the flow logs for patterns indicative of unwanted behavior by an executor. Various thresholds described for patterns can be determined empirically or set using machine learning algorithms, for example. One such pattern would be the attempted communication from one virtual machine instance within one session network to another session network. A single packet that traverses from one session network to another session network may indicate an intruder because sessions should generally not communicate. In response to detecting a potential intruder, the intrusion detector 390 can trigger an intrusion response. Exemplary intrusion responses include, assuming the asset has not been compromised, issuing an executor termination request to the session manager service 112 or to the agent 160 (if a remote kill-switch is implemented). If the asset is potentially compromised, the intrusion response can include terminating the asset itself via the resource manager service 114, for example.

Figure 4:
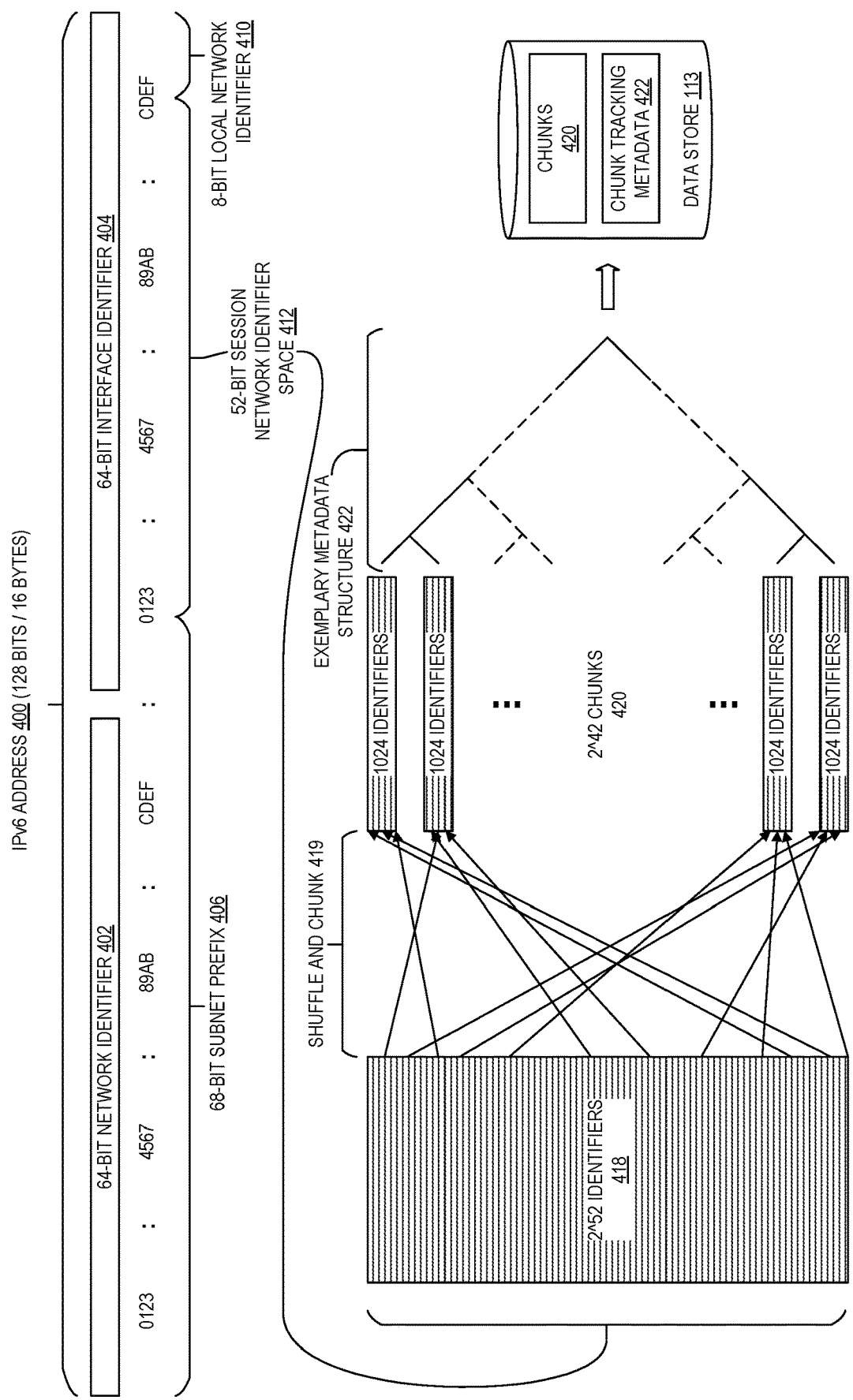
FIG. 4 illustrates an exemplary network addressing scheme used by the distributed data processing application service for cluster formation according to some embodiments.

FIG. 4 illustrates an exemplary network addressing scheme used by the distributed data processing application service for cluster formation according to some embodiments. As described above, a 128-bit IPv6 address 400 is represented as 8 groups of 16-bits each typically written in hexadecimal form. The address space is divided into two halves. The first (left most) 64 bits are the routing prefix or network identifier 402, and the second (right most) 64 bits are the interface identifier 404.

Generally, the IPv6 address can be divided into three (or more) portions for use by the distributed data processing application service. The three portions include an M-bit subnet prefix, an N-bit session network identifier, and an O-bit local network identifier, where M+N+O=128. In some embodiments, M+N+O may be less than 128 where one or more bits of the IPv6 address space are reserved for other purposes. In such cases the full IPv6 address of an executor is still formed by combining the subnet prefix, session network identifier, and local network identifier along with any bits used for other purposes.

In the embodiment illustrated in FIG. 4, one or more/68 subnet prefixes 406 are assigned to host computer systems such as computer systems 150. The right-most 8-bits represent a local network identifier 410 that distinguishes executors hosted by the same computer system for the same session network and sharing the same subnet prefix. The remaining middle portion of 52-bits creates a session network identifier space 412.

The 52-bit session network identifier space can support over a quadrillion session network identifiers 418. If collisions are avoided and session network identifiers are used to exhaustion, this would be equivalent to the number of sessions that could be run on the provider network before re-use from all potential session network identifiers having been exhausted. If a provider network averaged 5 million new jobs per day, it would take millions of years to run out of combinations.

In some embodiments, the network manager service 112 prepares the session network identifier space prior to use by the distributed data processing application service by optionally shuffling and chunking 419 the session network identifiers within the space. Shuffling session network identifiers serves several purposes. Randomizing the order in which session network identifiers are consumed improves collision avoidance (assuming other mechanisms might fail) and obfuscates launch rate. Additionally, the randomness increases time that an intrusion detector (e.g., the intrusion detector 390) has to detect a possible intrusion by increasing the time a would-be intruder would require to identify vulnerable sessions. Chunking permits the allocation of chunks of session network identifiers to the session manager service 110 in advance of launching a session, thereby removing the network manager service 112 from the session/executor launch path.

As illustrated, in one embodiment, the network manager service 112 shuffles the 52-bit session network identifier space 418 and then divides the shuffled space into chunks containing 1,024 session network identifiers each, resulting in $2^{42}$ chunks 420.

Another example of shuffling and chunking according to some embodiments follows. To reduce the shuffling computation size, P bits can be set aside to define an chronological partition. Chronological partitions can be slowly advanced through (e.g., from partition 0x00000 to partition 0x00001 if not shuffled) as the supply of session network identifiers in the remaining (52-P) bits becomes low or exhausted. The values from 0 to $2^P$ can be shuffled to create an order of chronological partitions.

Various techniques can be used to shuffle and chunk the remaining 52-P-bit session address space. In this example, assuming the first shuffle and chunk operation for the first chronological partition is performed prior to enabling the distributed data processing application service, subsequent shuffle and chunk operations of the next 52-P-bit session address space for the next chronological partition can be performed sometime before advancing to that next partition. Assuming a 20-bit chronological partition, the possible session network identifiers in the remaining 32-bits can be shuffled. The shuffled identifiers can be combined with the bits of the chronological partition and then divided into groups or "chunks" for allocation to the session manager service. An exemplary chunk size is 1,024. After accumulating 1,024 52-bit session network identifiers, the resulting "chunk" is written to storage and assigned a chunk identifier.

To track which chunks have been allocated in response to requests from the session manager service 110, the network manager service 112 can store metadata to indicate which of the chunks have been allocated. In some embodiments, the approach used to represent chunk allocation in the metadata would permit the concurrent allocation of chunks without contention (e.g., when the network manager service 112 is executed across multiple threads or systems). One such approach uses a binary tree to track the chunk entries in metadata 422 as follows. The chunks are divided into groups of 1,024. A binary tree is created over the groups. Each node in the tree will contain metadata that indicates if either/both of the children are fully allocated. Any number of machines/threads can traverse the tree at start-up by randomly walking the tree to locate a leaf that has unallocated chunks. Once selected, the thread can scan the group of 1,024 chunks until it finds the next unallocated chunk and begin to allocate from that position. If a machine/thread detects repeated allocation contention (e.g., conditional updates fail), it can walk randomly back up the tree until it finds a node with less contention. If a group is found to be fully allocated, the node above can be marked so that future traversals skip the subtree/group. Once marked, a machine/thread will randomly walk the tree to find another group.

Figure 5:
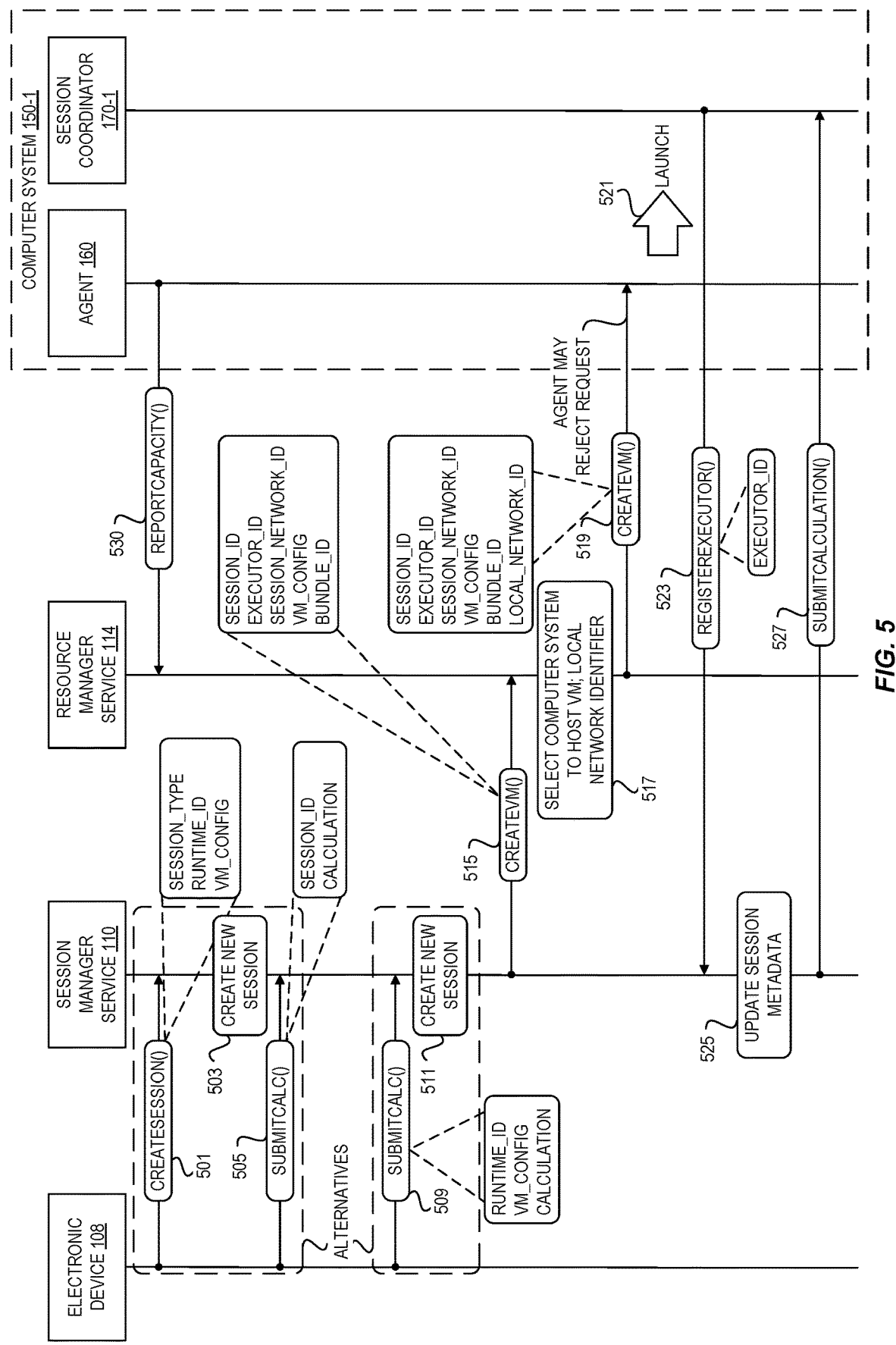
FIG. 5 illustrates an exemplary call flow for launching a first member of a cluster as illustrated in FIG. 1 according to some embodiments.

FIG. 5 illustrates an exemplary call flow for launching a first member of a cluster as illustrated in FIG. 1 according to some embodiments. Entities involved in the launch path include the session manager service 110, the resource manager service 114, and the agent 160 of the computer system 150-1.

The customer-facing API may take a variety of forms. Two examples are illustrated herein. In the first example, the customer-facing API allows a session to be explicitly created (call 501, operation 503, and call 505). Here, the session manager service 110 receives a create session call 501 (e.g., from the electronic device 108). The call 501 includes a session type (SESSION_TYPE), a runtime identifier (RUNTIME_ID), and a virtual machine configuration (VM_CONFIG). The session type can distinguish between persistent, manual sessions, standalone sessions, and interactive sessions, described above. The runtime identifier identifies the data processing tool supported by the cluster. The virtual machine configuration can include a default hardware configuration for virtual machines launched to support members of the cluster such as the number of virtual processors (or other processing unit) and the amount of memory to allocate from the host computer system to the virtual machine. Upon receipt of the create session call 501, the session manager service 110 performs operations 503 associated with creating a new session. Such operations include generating a new session identifier, selecting an unused session network identifier for the session, and updating session metadata to track the session, the associated session network identifier, and configuration data received with the call 501. The session manager service 110 can return the new session identifier to the caller.

Sometime later, the session manager service 110 receives a submit calculation call 505 (e.g., from the electronic device 108). The call 505 includes the session identifier and a calculation (CALCULATION), which may include or identify the location of the customer code to be executed by a cluster.

Returning to the second example of the customer-facing API, a session can also be implicitly created (call 509, operation 511). Here, the session manager service 110 receives a create submit calculation call 509 (e.g., from the electronic device 108). The call 501 includes a runtime identifier (RUNTIME_ID), a virtual machine configuration (VM_CONFIG), and a calculation (CALCULATION). While these parameters are similar to those described above, this call 501 implicitly creates a session. Upon receipt of the submit calculation call 509, the session manager service 110 performs operations 511 associated with creating a new session, similar to those described for operations 503 above, with the primary difference being the session identifier is not advertised to the submit calculation caller.

In either of the above two examples, the session manager service 110 receives a calculation to be performed on a cluster which thus far has zero members. To launch the first member of a cluster, the session manager service 110 issues a create virtual machine call 515 to the resource manager service 114. In the illustrated example, the call 515 includes the session identifier (SESSION_ID), an executor identifier (EXECUTOR_ID), the session network identifier (SESSION_NETWORK_ID), a virtual machine configuration (VM_CONFIG), and a bundle identifier (BUNDLE_ID). The session identifier is the session identifier previously assigned to the session by the session manager service 110. The executor identifier can be uniquely assigned to the outbound request for accounting purposes as will become apparently later when the session manager service 110 learns of the successful launch of the cluster member. The session network identifier corresponds to the session network identifier selected by the session manager service 110 when creating the session. The virtual machine configuration represents the hardware configuration of the virtual machine to be launched and may be or be based on the virtual machine configuration received in call 501 or 509. The bundle identifier identifies a pre-warmed bundle with the correct data processing tool (as determined by the runtime identifier previously received) for the virtual machine.

Upon receipt of call 515, the resource manager service 114 performs operations 517. Operations 517 include evaluating the available capacity of assets in the distributed data processing application service warm pool on which the requested virtual machine can be launched. This includes identifying which assets in the warm pool both have the hardware capacity to host the virtual machine and the appropriate bundle from which to launch the virtual machine. Once one or more assets that can satisfy the request are identified, the resource manager service 114 selects one of the identified assets and issues a create virtual machine call 519 to an agent on the selected asset. In this example, the call 519 is issued to the agent 160 on the computer system 150-1 (paralleling that illustrated in FIG. 1). The parameters of the call 519 largely mimic those of call 515. In this embodiment, the call 519 further includes a local network identifier. The resource manager service 114 can randomly select a local network identifier (the portion of the session network address that prevents conflict amongst two cluster members hosted by the same computer system; see FIG. 3).

In some embodiments, upon receipt of call 519, the agent 160 may reject the request. Rejection can occur for several reasons. First, in some embodiments, scaling may limit the resource manager service 114 to an eventually consistent view of the warm pool because the individual components of a distributed resource manager service do not maintain a "global" state of the assets on which virtual machines can be launched. Consequently, the resource manager service may inadvertently select a computer system that has insufficient resources to host a virtual machine of the requested size. For example, the resource manager service 114 itself may be a distributed service, and another component of that distributed service may have already requested capacity of the host computer system that the agent has consumed such that the request in call 519 cannot be fulfilled. In such a case, the agent 160 can reject the request, causing the resource manager service 114 to repeat the identification and selection operations 517 and issue a request to a different agent on a different computer system. Another reason for rejecting the request relates to the local network identifier. To limit the complexity (and thus improve the speed) of the resource manager service 114, the resource manager service 114 may make its selection of the local network identifier at random. If it happens to select a local network identifier already in use by a member of the cluster hosted on the selected computer system, the agent can reject the request. In such a case, the resource manager service 114 may randomly select a different local network identifier and resubmit a call to the same agent that rejected the previous request or, as was the case due to insufficient capacity, identify and select a different computer system toward which to direct a new request to launch the virtual machine.

Assuming the agent 160 does not reject the call 519 (e.g., return or "throw" an error), the agent initiates the launch of the virtual machine as indicated at 521. In this case, the virtual machine hosts the session coordinator 170-1. Once launched or during the launch of the session coordinator 170-1, the session coordinator 170-1 can issue a register executor call 523 to the session manager service 110. The call 523 includes the executor identifier to notify the session manager service 110 that the request it initiated at call 515 was successful.

In this manner, the agent 160 is authoritative for what is executed on the underlying computer system. Thus, rather than having some global state being continuously updated and managed as a shared resource, any "global" state of the distributed data processing application service is actually a function of the many local states of the computer systems over which the agents 160 have control. Additionally, an indication of the successful launch of the session coordinator 170-1 need not be signaled backward through the previous launch flow back (e.g., back to the resource manager service 114 from the agent 160, back to the session manager service 110 from the resource manager service 114) which would introduce unwanted delays. In this manner, calls in the launch flow for the session coordinator 170-1 are generally one-directional with the session manager service 110 ultimately learning about the successful completion of call 515 in call 523.

Upon receipt of call 523, the session manager service 110 performs operations 525. Operations 525 include updating the session metadata to associate the identity of the session coordinator 170-1 with the session identifier. For example, the session manager service 110 can identify the session coordinator 170-1 by the source network address of the call 523.

Now, with a first member added to a cluster for the session, the session manager service 110 issues a submit calculation call 527 to the session coordinator 170 that includes the calculation previously submitted at call 505 or 509. The call 527 can be issued through previously mentioned executor proxy service (not shown).

To facilitate the placement decisions of the resource manager service 114, agents of computer systems in a warm pool (e.g., the warm pool illustrated in FIG. 1) can periodically report their available capacity for hosting instances to the resource manager service 114. For example, the agent 160 of the computer system 150-1 issues a report capacity call 530 to the resource manager service 114. The contents of the call 530 can include, for example, the amount of free capacity on the computer system 150-1 that can be used to launch virtual machines (e.g., (e.g., in terms of processor and memory capacity, DPUs, etc.) as well as the available bundles have been locally downloaded to the computer system 150-1. Additional details on bundles are provided with reference to FIGS. 8 and 9.

In some embodiments, the distributed data processing application service may permit further customization of the cluster by the user. For example, the create session call 501 may include a bundle identifier in addition to or in place of the virtual machine configuration. As explained in further detail with reference to FIG. 8, some bundles may be pre-warmed using customer-specific configurations to further reduce the time to launch of a cluster member for a particular user. The session manager service 110 can store the specified bundle identifier in the session metadata 190 for that session and send that user-specified bundle identifier in the create virtual machine call 515. As another example, some users may want other provider network services to be directly addressable on a session network. Such other services can provide other compute resources, data/storage resources, network-related resources, and application resources such as those described above. In such cases, the create session call 501 may further identify other provider network services to connect to the cluster's session network, and the session manager service 110 can store the identification of those other provider network services stored in the session metadata 190 for that session. The session manager service 110 can then send additional networking configuration data in the create virtual machine call 515 for relaying to an agent 160 for use in configuring a launched executor environment with access to other provider network resources within the session network as described in further detail with reference to FIG. 7.

Figure 6:
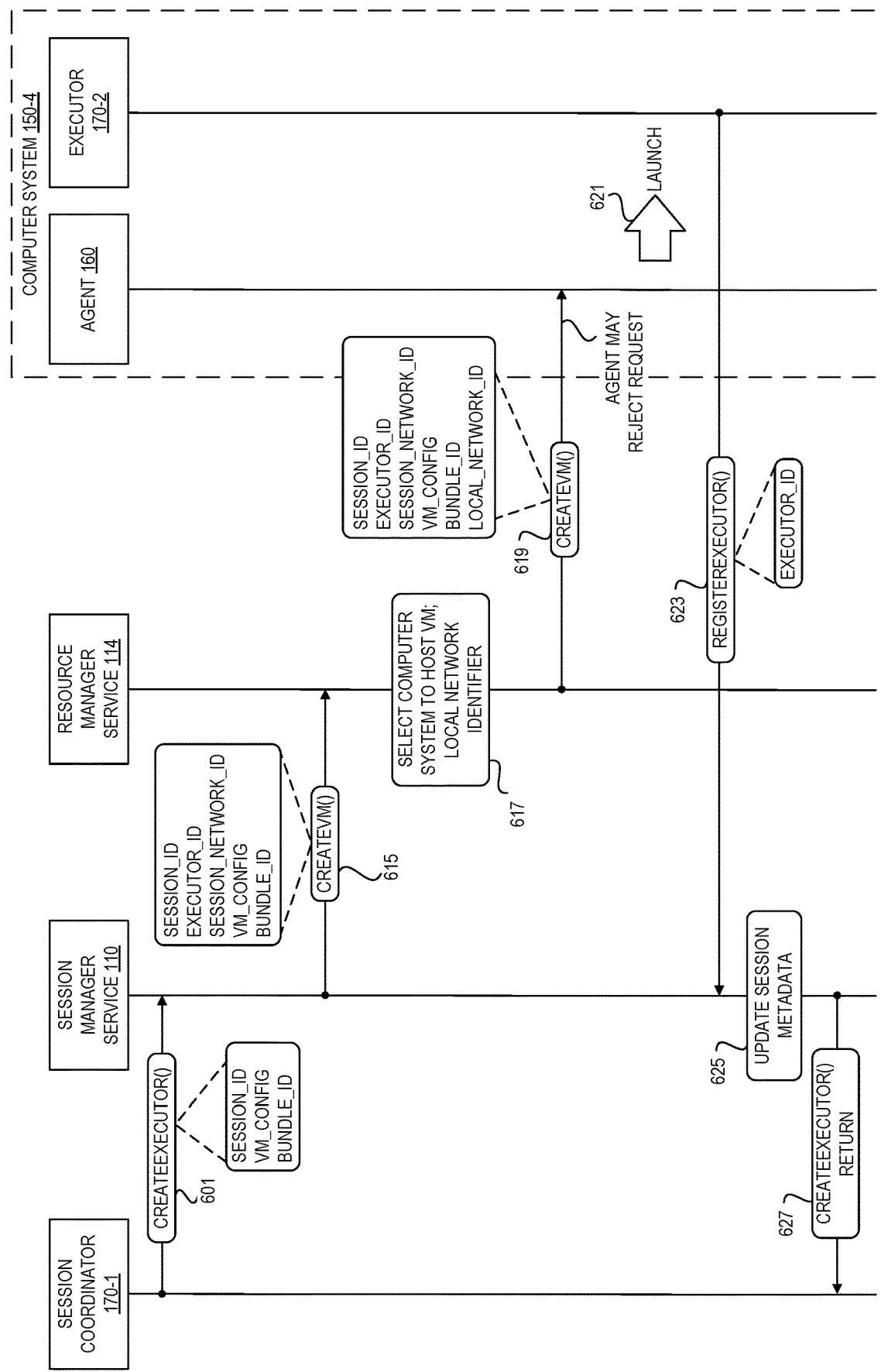
FIG. 6 illustrates an exemplary call flow for launching another member of the cluster as illustrated in FIG. 2 according to some embodiments.

FIG. 6 illustrates an exemplary call flow for launching another member of the cluster as illustrated in FIG. 2 according to some embodiments. Continuing from where FIG. 5 left off, at some point during the processing of the calculation, the session coordinator 170-1 can determine that it wants to distribute a portion of the calculation to another member of the cluster, but no other cluster members exist at this point. The session coordinator 170-1 can request additional members via the session manager service 110. To add a new member, the session coordinator 170-1 issues a create executor call 601 to the session manager service 110. The call 601 can include the session identifier (described above). The call 601 can further include the virtual machine configuration and the bundle identifier. Alternatively, the session manager service 110 can determine the virtual machine configuration and/or the bundle identifier to use in issuing a request for a new virtual machine based on the configuration data associated with the session identifier in the session metadata. The call 601 can also include a customer credential (obtained from the authentication service and loaded into the virtual machine environment executing the session coordinator 170-1).

At this point, the launch flow mimics the launch flow previously described with reference to FIG. 5. Call 615 is similar to call 515 but with a difference executor identifier, operations 617 are similar to operations 517, and call 619 is similar to call 519 but directed to agent 160 of the computer system 150-4. Again, the agent 160 may reject the call 619. Assuming it does not, the agent initiates the launch of the virtual machine as indicated at 621. In this case, the virtual machine hosts the executor 170-2. Once launched or during the launch of the executor coordinator 170-2, the executor 170-2 can issue a register executor call 623 to the session manager service 110. The call 623 includes the executor identifier to notify the session manager service 110 that the request it initiated at call 615 was successful Upon receipt of call 623, the session manager service 110 performs operations 625. Operations 625 include updating the session metadata to associate the identity of the executor 170-2 with the session identifier. For example, the session manager service 110 can identify the executor 170-2 by the source network address of the call 523.

Now, with a second member added to a cluster for the session, the session manager service 110 can provide a response 627 to call 601 that includes an identification of the new cluster member (e.g., by network address). Upon receipt of the identity of the new cluster member, the distributed data processing application tool runtime can distribute a portion of the calculation to the new member.

Figure 7:
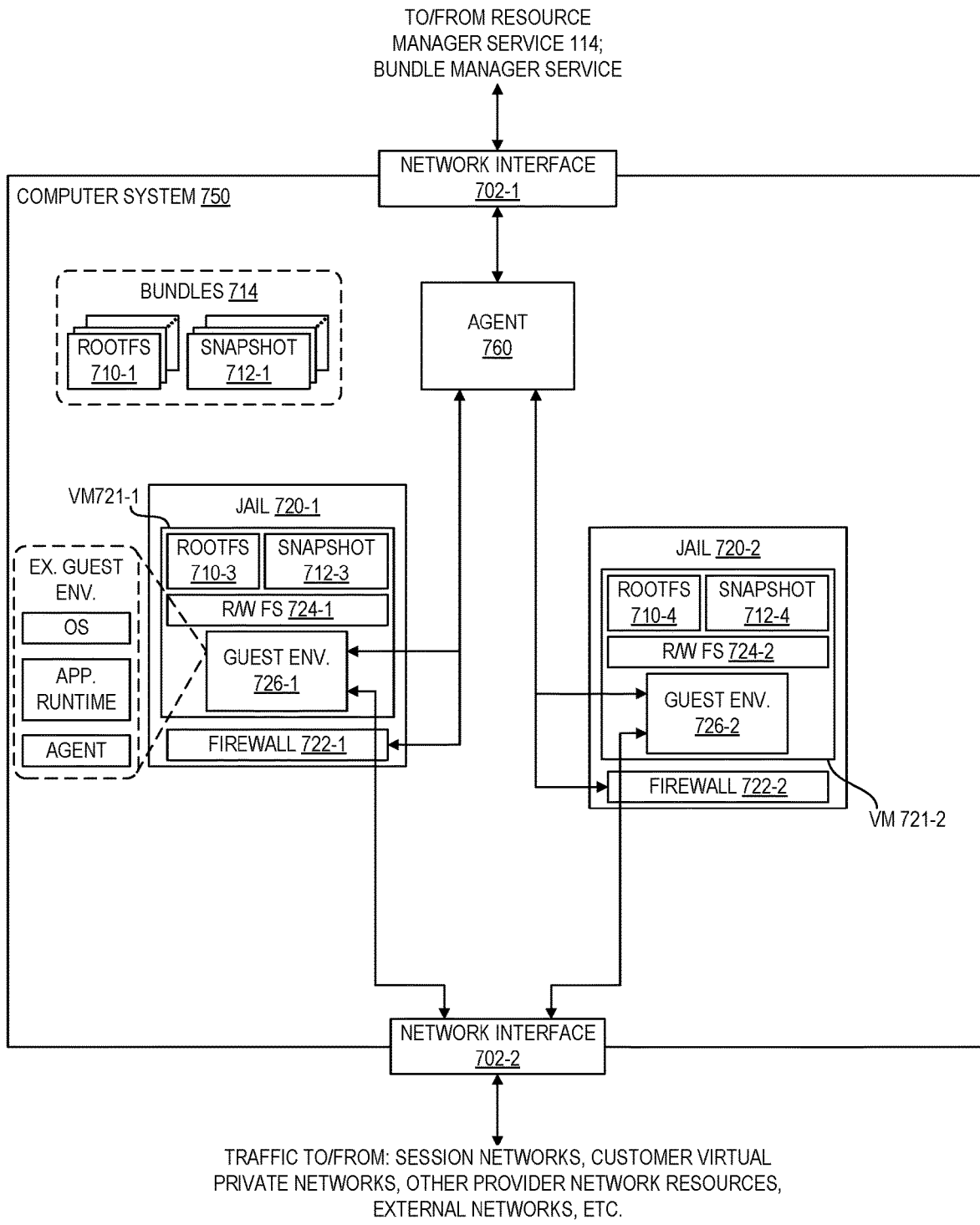
FIG. 7 illustrates an example cloud provider network computer system that hosts members of a computing cluster according to some embodiments.

FIG. 7 illustrates an example cloud provider network computer system that hosts members of a computing cluster according to some embodiments. In this example, the computer system 750 runs an agent 760 (e.g., agent 160). The agent 760 interfaces with the resource manager service 114 and manages the lifecycle of hosted virtual machines. In particular, the agent 160 orchestrates the creation and destruction of virtual machines and their containment layer(s) within the host environment to limit access of processes executed within a virtual machine to the larger host computer system environment. The agent 160 also interfaces with an agent running within the launched virtual machines to load VM specific configuration data. Such configuration data can include, a customer credential, the executor identifier, the session identifier, the session network identifier, etc. In some embodiments, the agent 760 is considered a lightweight VMM and the launched virtual machines are microVMs.

The computer system stores bundles 714 in local storage. A bundle typically includes paired root file system (rootfs) image 710 and a virtual machine snapshot 712 that contains the state of a pre-warmed virtual machine. As described with reference to FIG. 9, the agent 760 can periodically update the locally stored bundles 714 by requesting updates from a bundle manager service (not shown).

Upon receipt of a request to launch an executor from the resource manager service 114, the agent 760 can perform one or more checks to, for example, verify the computer system 750 has sufficient capacity to launch the virtual machine and can then launch the virtual machine. As described above, such a request from the resource manager service 114 can include a software and/or hardware configuration, with the software configuration identifying one of the bundles 714 from which to launch the virtual machine and the hardware configuration identifying the characteristics of the virtual machine to be launched (e.g., number of DPUs). The agent 770 can track the amount of available memory and compute capacity based on the total amount of memory and compute capacity available to launch virtual machines and any existing virtual machines hosted by the computer system 750. If the agent 760 determines that the computer system 750 has insufficient resources to host the requested virtual machine, the agent 760 can reject the create virtual machine call from the resource manager service 114.

In this example, the computer system 750 also includes a network interface 702-1 and a network interface 702-2. The network interface 702-1 carries traffic to and from the distributed data processing application service components such as the resource manager service 714, an authentication service from which to obtain credentials, and a bundle manager service from which to obtain bundles, described below. The network interface 702-2 carries traffic to and from other sources/destinations. Such other traffic includes traffic to/from other executors within the same session as an executor hosted by the computer system 750. Such other traffic can include traffic to/from an "egress" virtual private cloud with endpoints that allow hosted applications to connect to data sources hosted by the provider network or outside of the provider network (e.g., accessible via the internet). For example, the customer that initiated the launch of a hosted executor might have data stored in a virtualized storage service, database (e.g., SQL or NoSQL), or other location within the provider network. Such other traffic can include traffic to/from other customer-specific virtual private clouds (VPC). For example, a customer may request that the session network be connected to a VPC of the customer. A secure tunnel is established to carry traffic between a specific executor of a customer and an endpoint of that customer's VPC.

Upon determining that a request to create a virtual machine can be fulfilled, the agent 760 can proceed to launch the requested virtual machine as follows. The agent 760 begins the process of launching a virtual machine by creating a jail within the host operating system environment within which to launch the virtual machine. A jail refers to one or more containment layers provided by the host operating system to limit (or prevent) access of processes executing within the jail from the broader host environment. Such jailing techniques may also be referred to as "sandboxing" the virtual machine environment. The agent 760 then identifies a snapshot 712 from which to launch the virtual machine as part of the configuration data for the launch. In some embodiments, the agent 760 provides the to-be-launched virtual machine with a copy of the snapshot 712 to prevent side-channel attacks between virtual machines using the same snapshot. The agent 760 can also symlinks the to-be-launched virtual machine to a read-only shared copy of the rootfs 710 corresponding to the snapshot 712 from which it will launch. The agent 760 can also create a read-write ephemeral, sparse, filesystem file 724 for to-be-launched virtual machine. In some embodiments, the agent 760 may also configure the virtual network devices within the jail with an overly restrictive initial set of firewall rules to allow the agent 760 to perform actions on the to-be-launched virtual machine before exposing it to the session network.

At this point, the agent 760 launches the virtual machine as a dedicated user within the previously created jail. In some embodiments, the agent 760 performs post-launch checks of the newly launched virtual machine. The checks can include various activities like generating probing traffic to ensure the firewall is appropriately blocking access that is not in the explicit allow-list for the virtual machine.

As illustrated, the agent 760 has launched two virtual machines 721 on the computer system 750. The virtual machine 721-1 is executing a guest environment 726-1 having a rootfs 710-3, a snapshot 712-3, and an ephemeral file system 724-1. An exemplary guest environment includes an operating system, the distributed data processing application runtime, and an agent to interface with the distributed data processing application service (e.g., to report local heartbeats to the agent 760, to provide hooks to pause and resume calculations, and/or to provide a point of presence for the agent 760 to further configure the virtual machine upon launch and before handing control to the customer session). The virtual machine itself is isolated within a jail 720-1 that includes a firewall 722-1.

The virtual machine 721-2 is executing a guest environment 726-2 within a virtual machine having a rootfs 710-4, a snapshot 712-4, and an ephemeral file system 724-4. Again, the guest environment can include (although not shown) an operating system, a distributed data processing application runtime, and, optionally, an agent to help the application runtime interface with the distributed data processing application service. The virtual machine itself is isolated within a jail 720-2 that includes a firewall 722-2.

The agent 760 can also load any application data included with or identified in the request from the resource manager service 714 to the agent operating within the guest environment. The agent within the guest environment can then make such configuration data available to the application runtime as environment variables, for example.

As part of launching the virtual machine, the agent 760 forms and assigns an IPv6 address to the virtual machine. In particular, the agent 760 forms the IPv6 address of the virtual based on an IPv6 subnet assigned to the computer system 750 and the session network and local network identifiers received in the request to launch the virtual machine from the resource manager service 114. In some embodiments, the agent 760 forms the IPv6 for the new virtual machine by concatenating an IPv6 subnet prefix assigned to the computer system 750, the session network identifier, and the local network identifier.

In some embodiments, rather than have the resource manager service 114 generate the local network identifier and include it in the request, the agent 760 can determine the network local identifier such that it can uniquely identify multiple virtual machines hosted by the computer system 750 that are part of the same session network, thereby eliminating one of the reasons that request to launch a virtual machine might be rejected. The agent 760 can randomly select a local network identifier and verify that it does not conflict with another virtual machine having the same session network identifier. Such a verification can be accomplished using an in-memory hash.

As illustrated, firewalls 722-1 and 722-2 control communications between respective virtual machines 721-1 and 722-2 and any linked network interfaces 702.

As part of launching a virtual machine, the agent 760 configures the firewall 722 associated with the virtual machine to permit traffic to and from other virtual machines that are part of the same session network. To do so, the agent 760 configures the firewall with the session network identifier in the bit positions appropriate for the particular addressing scheme (e.g., bits 47-8 in the addressing scheme illustrated in FIG. 3, bits 45-9 in the addressing scheme illustrated in FIG. 4) and a mask to only match on those bit positions. More generally, the firewall would require inbound and outbound traffic to match of the address bits corresponding to the mask bits having a value of '1' while ignoring those address bits corresponding to mask bits having a value of '0.' For example, the firewall rule for session network 372 in FIG. 3 would permit traffic matching the address 4567:89AB:CD00 with a mask of FFFF:FFFF:FF00. As another example, the firewall rule for a session network formed using the addressing scheme illustrated in FIG. 4 and having a session network identifier 23456789AC would permit traffic having an address 2345:6789:AC00 with a mask of FFFF:FFFF:FE00. In this manner, the firewall would not block inbound or outbound traffic that matches the session network identifier portion of an address associated with the virtual machine. In this manner, the firewalls of existing executors in a session do not require updating even as other executors are added to or removed from the session network.

As noted above, a customer may wish for other provider network resources to be accessible from directly within a cluster's session network. The network configuration for the other resource(s) can be identified in the request to launch a virtual machine received by the agent 760. Exemplary configuration data can include (1) an identification of the other provider network resource as an actual provider network address or alias of the other resource and (2) a network address based upon the session network identifier to associate with the other provider network resource. The agent 760 can configure the firewall 722 associated with the launched virtual machine to perform address translation between the session network address associated with the other provider network resource and the actual provider network address or alias of the other resource and vice versa.

Figure 8:
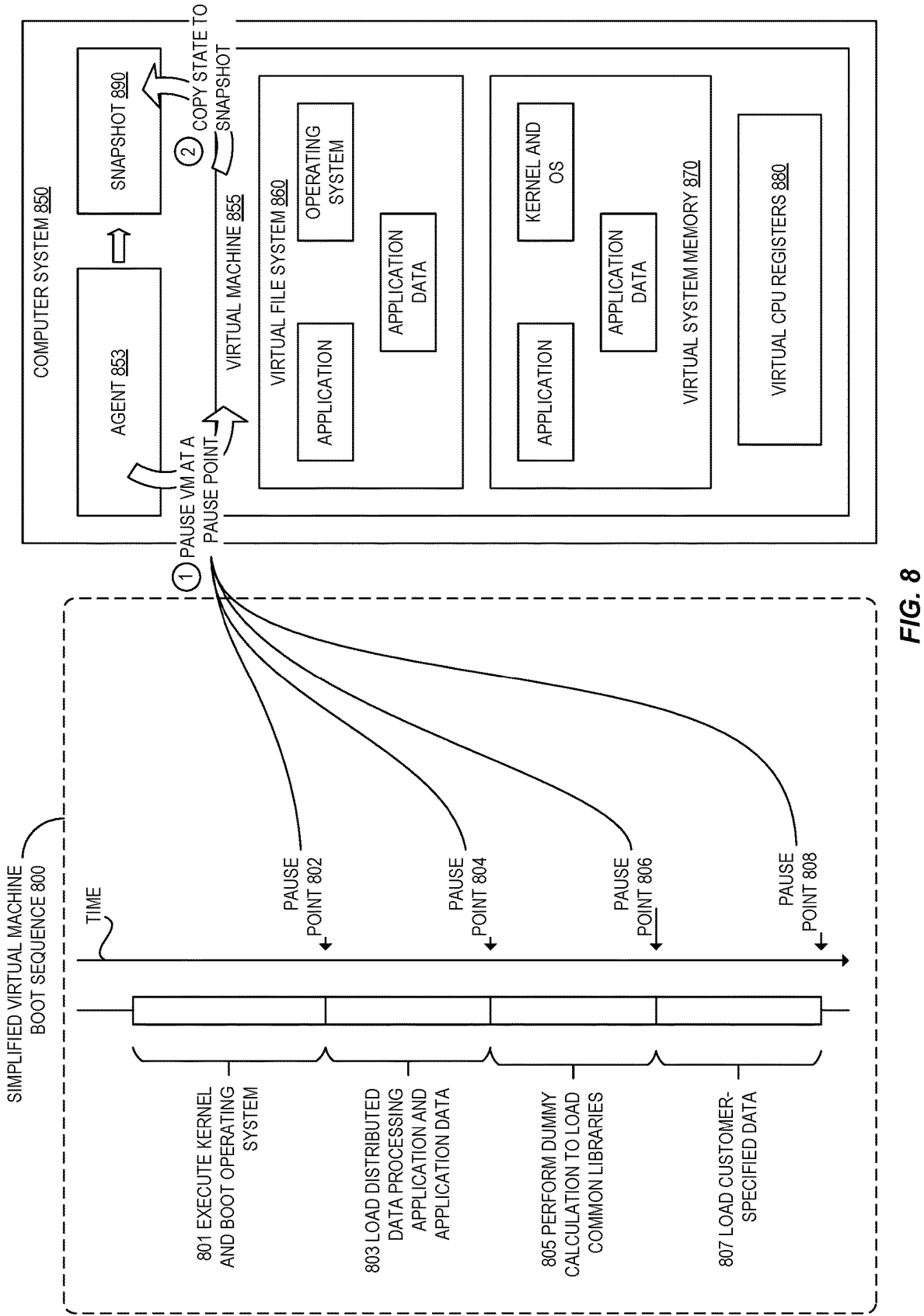
FIG. 8 illustrates an agent capturing the state of a virtual machine after launching at least a portion of an application according to some embodiments.

FIG. 8 illustrates an agent capturing the state of a running virtual machine from which to form a bundle to launch future virtual machines thereby reducing launch delay. As mentioned above, one aspect that contributes to the rapid launch of cluster members is the use of "pre-warmed" virtual machine bundles. A bundle refers to a grouping of virtual machine software, configuration, and state that is used to launch a virtual machine instance. For example, a bundle can include a kernel, operating system, an application runtime, and a copy of the virtual machine's system memory and processor registers captured at a point in time. Pre-warmed bundles are so named because the virtual machine state is captured such that the distributed data processing application runtime is already "running" when a new virtual machine is launched and resumed using the bundle. Different distributed data processing applications may permit different degrees of how far the application can advance prior to being be captured before the individual tool loads and processes session-specific configuration data (e.g., the identity of cluster members, a portion of the customer-submitted calculation, etc.).

The right portion of FIG. 8 illustrates a computer system 850 executing an agent 853. The agent 853 can manipulate and capture the operation of a virtual machine 855 hosted by the computer system 850. Such manipulations include pausing and restarting the execution of the virtual machine. Additionally, the agent 853 can copy the state of a virtual machine (e.g., the system memory and processor registers) in a paused state and store that data as a "snapshot" 890.

The virtual machine 855 includes a virtual file system 860 (which may be a read/write file system), a virtual system memory 870, and virtual CPU (central processing unit) registers 880. A read-only root file system (not shown) may also be used by the virtual machine.

During the boot of the virtual machine 855 and subsequent application execution, data can be loaded from the virtual file system 860 into the virtual system memory 870. Exemplary data loaded from the file system 860 into the system memory 870 can include a kernel that boots the virtual machine, an operating system, an application (e.g., a distributed data processing tool), and application data (e.g., libraries or other resources loaded by the application).

The left portion of FIG. 8 illustrates a simplified virtual machine boot sequence 800. As indicated by the vertical arrow, time progresses from top to bottom. The boot sequence 800 can include an initial time period 801 during which the virtual machine executes the kernel and boots the operating system, thereby causing associated data to be loaded into the virtual machine's system memory 870 from the file system 860. The boot sequence 800 can include another time period 803 during which the virtual machine begins execution of the application runtime, thereby causing the application and associated data to be loaded into the virtual machine's system memory 870 from the file system 860. After one or more of these time periods, the agent 863 can pause the execution of the virtual machine 855, as indicated at circle 1, and copy the state of the virtual machine into a snapshot, as indicated at circle 2. For example, the agent 853 can pause the virtual machine 855 at pause point 802 after time period 801 or at pause point 804 after time period 803. Capturing a snapshot of the virtual machine at one or more of these points effectively eliminates the customer- or session-agnostic execution time from future launch of virtual machines based on those captured snapshots. While eliminating all of the customer- and/or session-agnostic boot time is beneficial, further optimizations are possible.

The boot sequence 800 can include another time period 805 during which the application runtime is configured to execute a dummy calculation, thereby loading additional libraries or other dependencies into the virtual machine's system memory 870 from the file system 860. The boot sequence 800 can include another time period 805 during which the application runtime is configured to execute customer-specific code, thereby loading customer-specific libraries or other dependencies into the virtual machine's system memory 870 from the file system 860. Note that in this latter case, the resulting snapshot and ultimately the bundles used to launch a virtual machine would be customer-specific. Again, the agent 853 can pause the execution of the virtual machine 855 after one or more of these time periods Y05 and 805 at pause points 806 and 808, respectively, and capture snapshots of the virtual machine's state at such points.

To provide one example of loading data using a dummy calculation, Spark itself runs using a java virtual machine. The Spark runtime loaded into memory can be instructed to execute a dummy calculation. The dummy calculation is written to exercise some common classes often used by customer calculations. By performing the dummy calculation, the application thereby causes the associated classes to be compiled into the java virtual machine. At this point in the execution, the agent can pause the virtual machine and then can terminate any classes that were created as part of the dummy calculation while leaving the compiled class footprints in memory. In this manner, a customer calculation executed by a virtual machine subsequently launched from the snapshot can leverage that class already present in memory without absorbing the delay loading that class into the java virtual machine.

Figure 9:
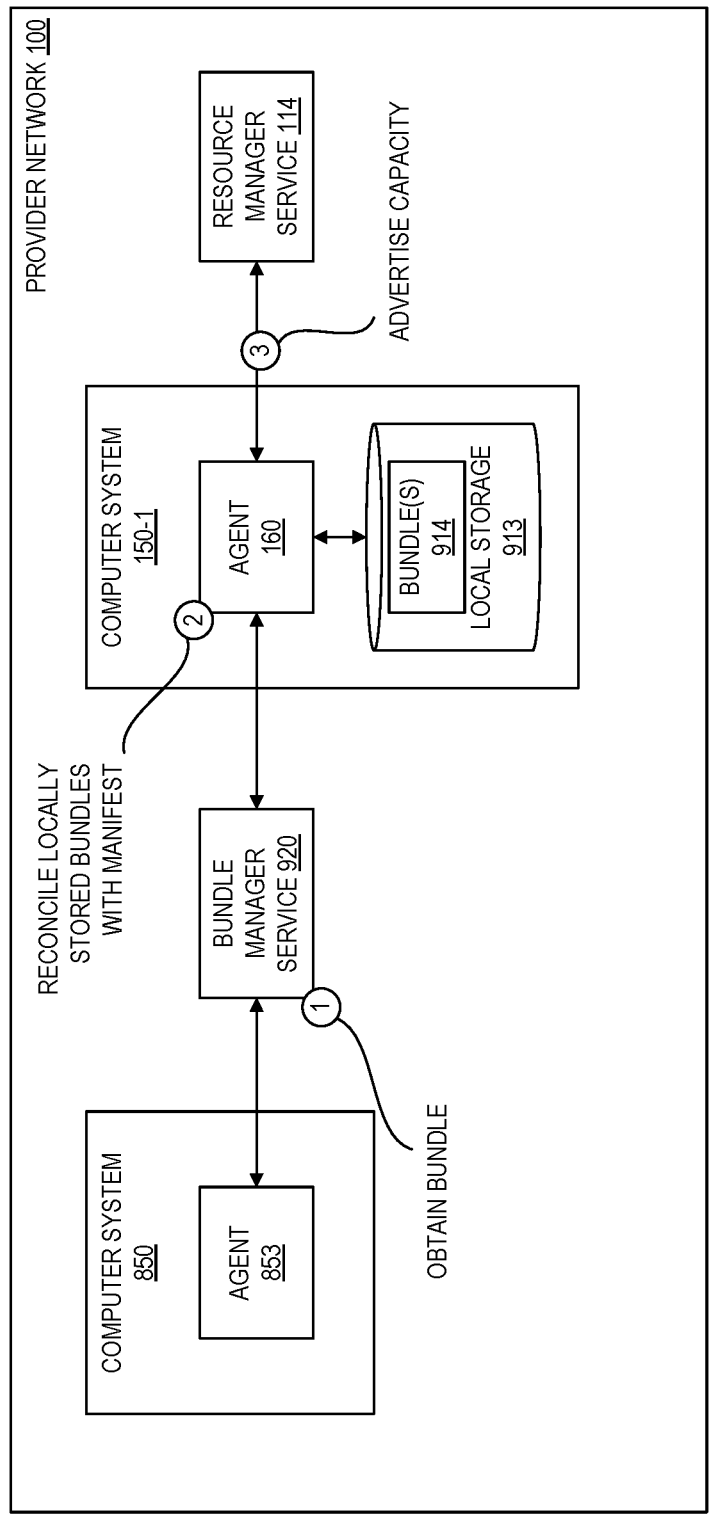
FIG. 9 illustrates a bundle manager service that facilitates the distribution of bundles to computer systems according to some embodiments.

FIG. 9 illustrates a bundle manager service that facilitates the distribution of bundles to computer systems according to some embodiments. The bundle manager service facilitates the distribution of bundles including state data captured as described with reference to FIG. 8 to computer systems in the distributed data processing application service warm pool. As illustrated, a bundle manager service 920 interfaces with the agent 853 involved in the virtual machine snapshot creation and with the agent 160 that manages the virtual machine lifecycle for distributed data processing application service cluster members hosted on the computer system 150-1.

A bundle includes virtual machine software, configuration, and state that is used to launch a virtual machine instance. The bundle for a particular virtual machine snapshot can be compiled by the agent 853, for example. In some embodiments, a bundle is a container that includes a bundle identifier that uniquely identifies the, an application name (e.g. Spark), an application version (e.g., 3.0), a bundle version akin to a build number, the snapshot including the memory and registers, a root file system (e.g., that includes the operating system and application runtime), and a hardware configuration (e.g., amount of system memory for the virtual machine, number of virtual CPUs for the virtual machine, mount points, network and other virtual devices, etc.).

At circle 1, the bundle manager service 920 obtains a bundle from the agent 853 and adds it to a data store (not shown) used by the bundle manager service 920 to store bundles. At circle 2, the agent 160 of the computer system 150-1 (or any agent of a computer system in the warm pool fleet) obtains a manifest indicating which bundles 914 should be stored in local storage 913 of the computer system. Another component of the distributed data processing application service can periodically push manifests to agents 160, for example. The agent 160 deletes any bundles not included in the manifest from local storage 913 and requests any bundles included in the manifest but not present in local storage from the bundle manager service 920. Once downloaded, the agent 160 sends a message advertising its capability to the resource manager service 114 as indicated at circle 3 (e.g., similar to call 530 of FIG. 5). The resource manager service 114 can then update its view of the warm pool fleet (e.g., to consider the computer system 150-1 when selecting a system to host virtual machines from newly downloaded bundles or to remove the computer system 150-1 from consideration when selecting a system to host virtual machines from a deleted bundle).

In some embodiments, a bundle comprises an index that identifies each of the objects that are part of the bundle (e.g., the root file system, the virtual machine memory snapshot, the virtual machine register snapshot, etc.). To improve performance, the agent 160 can advertise the presence of a bundle to the resource manager service 114 after downloading only a portion of the bundle (e.g., the index and any objects necessary to launch the virtual machine). The agent 160 can then download other objects that are part of the bundle (e.g., those that will be used by the distributed data processing application once a calculation has begun) after advertising the bundle to the resource manager service 114 or upon receiving a request to create a virtual machine from the partially download bundle.

Figure 10:
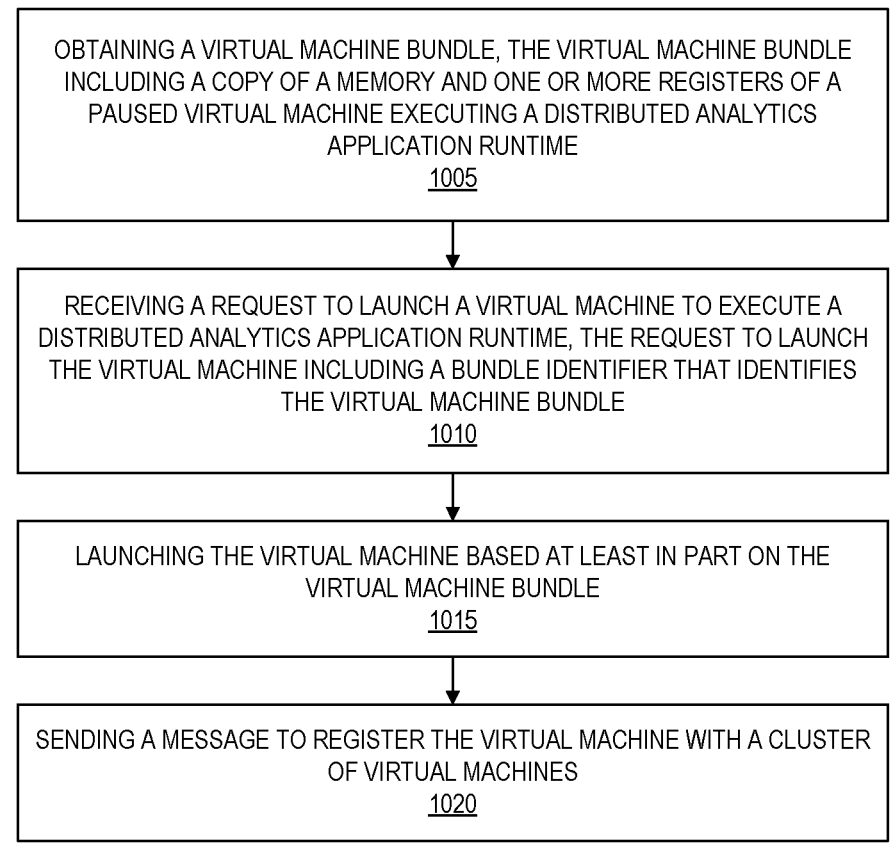
FIG. 10 illustrates a method for launching a new member to a computing cluster according to some embodiments.

FIG. 10 illustrates a method for launching a new member to a computing cluster according to some embodiments. Some or all of the operations 1000 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 1000 are performed by a combination of one or more of an agent of a computer system that hosts virtual machine instances (e.g., the agent 160, the agent 760) and a virtual machine launched by that agent, for example.

The operations 1000 include, at block 1005, obtaining a virtual machine bundle, the virtual machine bundle including a copy of a memory and one or more registers of a paused virtual machine executing a distributed data processing application runtime. As described herein, a virtual machine bundle can include a copy of the memory and registers of a virtual machine paused at a certain point in execution. FIG. 8 and the associated description include details of such bundles that can be pre-warmed for use in launching clusters using a warm pool of computer systems in the distributed data processing application service. To eliminate delays associated with downloading bundles from which to launch a virtual machine in response to a request to launch the virtual machine, an agent of a host computer system can occasionally update the locally stored bundles such that they are available for use upon receipt of a request to launch a virtual machine therefrom, such as described with reference to FIG. 9.

The operations 1000 further include, at block 1010, receiving a request to launch a virtual machine to execute a distributed data processing application runtime, the request to launch the virtual machine including a bundle identifier that identifies the virtual machine bundle. For example, at circle 7 of FIG. 1, the agent 160 of the computer system 150-1 receives a request to launch a new member of a cluster of computing resources to execute a distributed data processing application. In that example, the cluster has zero members at that point in time. Additional details of the call flow that results in the agent receiving a request to launch a virtual machine can be found in FIGS. 5 and 6 and the associated descriptions.

The operations 1000 further include, at block 1015, launching the virtual machine based at least in part on the virtual machine bundle. For example, the agent 160 can allocate some amount of compute and memory capacity of the host computer system as part of launching the virtual machine. In some embodiments, launching the virtual machine includes the agent copying a paused memory and registers of another virtual machine that had been previously paused and captured at a point in execution time and stored as part of a bundle to the launched virtual machine and resuming the launched virtual machine from that point in execution time. Additional details of the launch process can be found in FIGS. 7 and 8 and the associated descriptions.

The operations 1000 further include, at block 1020, sending a message to register the virtual machine with a cluster of virtual machines. As noted above, the session manager service 110 maintains metadata that can be used to track sessions. To reduce launch delays, a successfully launch executor is registered with the session manager service 110 by sending a message from the virtual machine executing the executor rather than relayed back through the launch path. Additional details on the registration of cluster members such as session coordinators and other executors with the session manager service can be found in FIGS. 1, 2, 5, and 6 and the associated descriptions.

Figure 11:
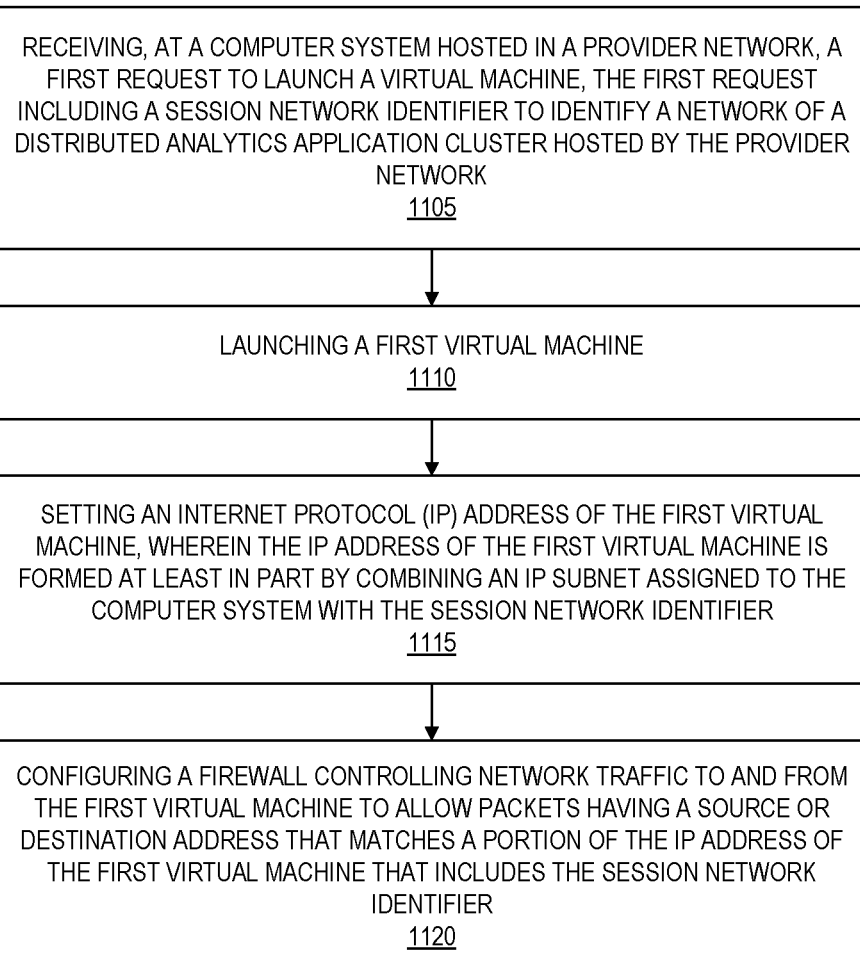
FIG. 11 illustrates a method for establishing network communication amongst executors of a distributed data processing application according to some embodiments.

FIG. 11 illustrates a method for establishing network communication amongst executors of a distributed data processing application according to some embodiments. Some or all of the operations 1100 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 1100 are performed an agent of a computer system that hosts virtual machine instances (e.g., the agent 160, the agent 760), for example.

The operations 1100 include, at block 1105, receiving a first request to launch a virtual machine, the first request including a session network identifier to identify a distributed data processing application cluster hosted by the provider network. For example, at circle 7 of FIG. 1, the agent 160 of the computer system 150-1 receives a request to launch a new member of a cluster of computing resources to execute a distributed data processing application. In that example, the cluster has zero members at that point in time. The session network identifier is used to establish a session network, such as illustrated in FIGS. 3 and 4. Additional details of the call flow that results in the agent receiving a request to launch a virtual machine can be found in FIGS. 5 and 6 and the associated descriptions.

The operations 1100 further include, at block 1110, launching a first virtual machine. For example, the agent 160 can allocate some amount of compute and memory capacity of the host computer system as part of launching the virtual machine. In some embodiments, launching the virtual machine includes the agent copying a paused memory and registers of another virtual machine that had been previously paused and captured at a point in execution time to the launched virtual machine and resuming the launched virtual machine from that point in execution time. Additional details of the launch process can be found in FIGS. 7 and 8 and the associated descriptions.

The operations 1100 further include, at block 1115, setting an IP address of the first virtual machine, wherein the IP address of the first virtual machine is formed at least in part by combining an IP subnet assigned to the computer system with the session network identifier. For example, as illustrated in FIGS. 3 and 4, the session network identifier is used to form a portion of an IP address assigned to a virtual machine. The full IP address of the virtual machine can include a subnet prefix that is assigned to the host computer system as well as a local network identifier suffix that permits the unique identification of the virtual machine from other virtual machines that may be hosted by the same computer system as part of the same cluster with the same subnet prefix. The full IP address can be formed by combining the M-bits of the subnet prefix, with the N-bits of the session network identifier, and with the O-bits of the local network identifier.

The operations 1100 further include, at block 1120, configuring a firewall controlling network traffic to and from the first virtual machine to allow packets having a source or destination address that matches a portion of the IP address of the first virtual machine that includes the session network identifier. As described herein, the session network identifier allows the formation of session networks in a distributed manner each agent that launches a virtual machine as part of a particular cluster can configure that virtual machine to communicate with other members of that cluster without the need to update other members of the cluster. Additional details of the firewall configuration can be found in FIG. 7 and the associated description.

Figure 12:
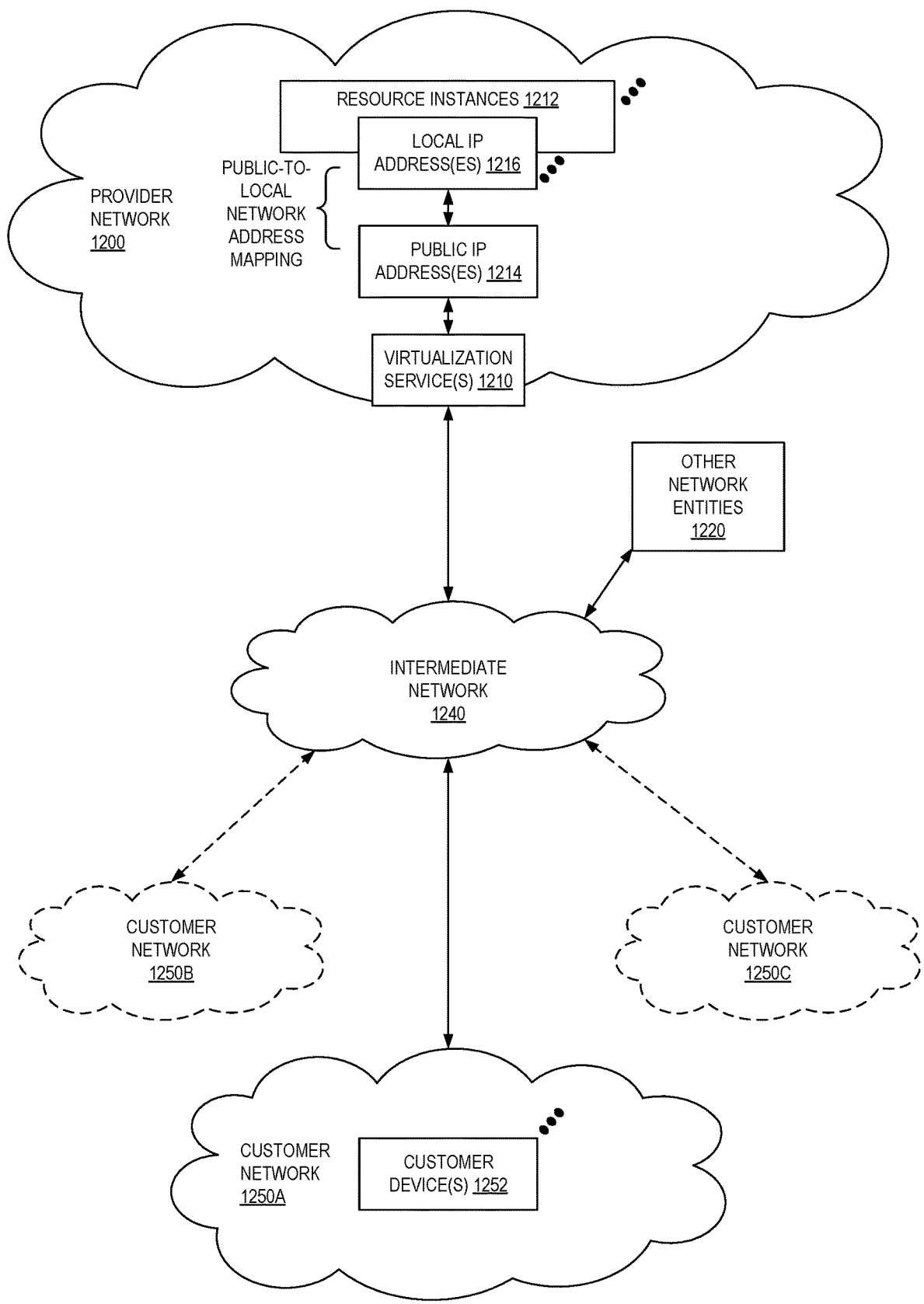
FIG. 12 illustrates an example provider network environment according to some embodiments.

FIG. 12 illustrates an example provider network (or "service provider system") environment according to some embodiments. A provider network 1200 can provide resource virtualization to customers via one or more virtualization services 1210 that allow customers to purchase, rent, or otherwise obtain instances 1212 of virtualized resources, including but not limited to computation and storage resources, implemented on devices within the provider network or networks in one or more data centers. Local Internet Protocol (IP) addresses 1216 can be associated with the resource instances 1212; the local IP addresses are the internal network addresses of the resource instances 1212 on the provider network 1200. In some embodiments, the provider network 1200 can also provide public IP addresses 1214 and/or public IP address ranges (e.g., Internet Protocol version 4 (IPv4) or Internet Protocol version 6 (IPv6) addresses) that customers can obtain from the provider 1200.

Conventionally, the provider network 1200, via the virtualization services 1210, can allow a customer of the service provider (e.g., a customer that operates one or more customer networks 1250A-1250C (or "client networks")

including one or more customer device(s) 1252) to dynamically associate at least some public IP addresses 1214 assigned or allocated to the customer with particular resource instances 1212 assigned to the customer. The provider network 1200 can also allow the customer to remap a public IP address 1214, previously mapped to one virtualized computing resource instance 1212 allocated to the customer, to another virtualized computing resource instance 1212 that is also allocated to the customer. Using the virtualized computing resource instances 1212 and public IP addresses 1214 provided by the service provider, a customer of the service provider such as the operator of the customer network(s) 1250A-1250C can, for example, implement customer-specific applications and present the customer's applications on an intermediate network 1240, such as the Internet. Other network entities 1220 on the intermediate network 1240 can then generate traffic to a destination public IP address 1214 published by the customer network(s) 1250A-1250C; the traffic is routed to the service provider data center, and at the data center is routed, via a network substrate, to the local IP address 1216 of the virtualized computing resource instance 1212 currently mapped to the destination public IP address 1214. Similarly, response traffic from the virtualized computing resource instance 1212 can be routed via the network substrate back onto the intermediate network 1240 to the source entity 1220.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by customers of the provider network 1200; a customer can then assign their allocated public IP addresses to particular resource instances allocated to the customer. These public IP addresses can be referred to as customer public IP addresses, or simply customer IP addresses. Instead of being assigned by the provider network 1200 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 13:
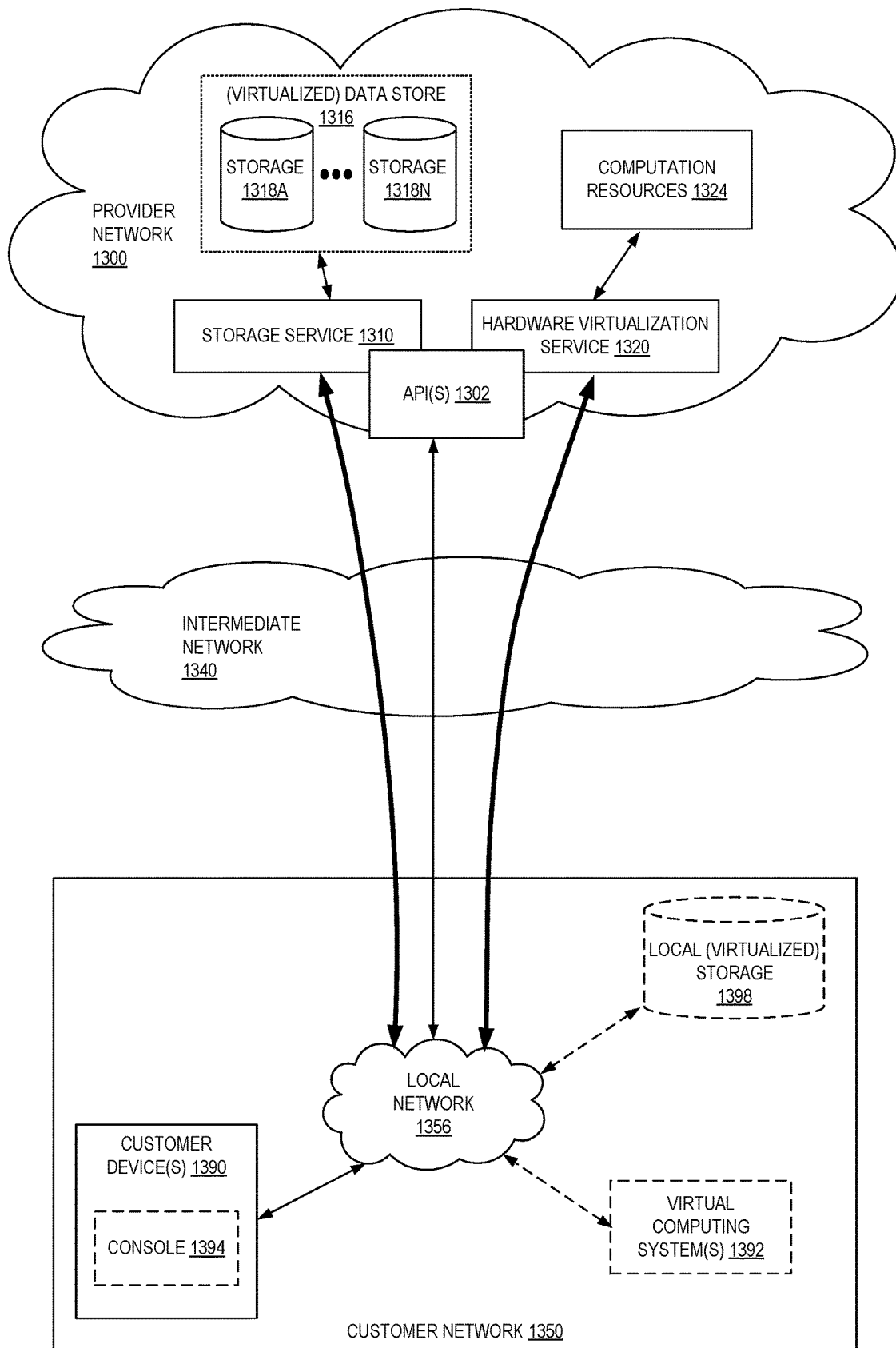
FIG. 13 is a block diagram of an example provider network that provides a storage service and a hardware virtualization service to customers according to some embodiments.

FIG. 13 is a block diagram of an example provider network environment that provides a storage service and a hardware virtualization service to customers, according to some embodiments. A hardware virtualization service 1320 provides multiple compute resources 1324 (e.g., compute instances 1325, such as VMs) to customers. The compute resources 1324 can, for example, be provided as a service to customers of a provider network 1300 (e.g., to a customer that implements a customer network 1350). Each computation resource 1324 can be provided with one or more local IP addresses. The provider network 1300 can be configured to route packets from the local IP addresses of the compute resources 1324 to public Internet destinations, and from public Internet sources to the local IP addresses of the compute resources 1324.

The provider network 1300 can provide the customer network 1350, for example coupled to an intermediate network 1340 via a local network 1356, the ability to implement virtual computing systems 1392 via the hardware virtualization service 1320 coupled to the intermediate network 1340 and to the provider network 1300. In some embodiments, the hardware virtualization service 1320 can provide one or more APIs 1302, for example a web services interface, via which the customer network 1350 can access functionality provided by the hardware virtualization service 1320, for example via a console 1394 (e.g., a web-based application, standalone application, mobile application, etc.) of a customer device 1390. In some embodiments, at the provider network 1300, each virtual computing system 1392 at the customer network 1350 can correspond to a computation resource 1324 that is leased, rented, or otherwise provided to the customer network 1350.

From an instance of the virtual computing system(s) 1392 and/or another customer device 1390 (e.g., via console 1394), the customer can access the functionality of a storage service 1310, for example via the one or more APIs 1302, to access data from and store data to storage resources 1318A-1318N of a virtual data store 1316 (e.g., a folder or "bucket," a virtualized volume, a database, etc.) provided by the provider network 1300. In some embodiments, a virtualized data store gateway (not shown) can be provided at the customer network 1350 that can locally cache at least some data, for example frequently accessed or critical data, and that can communicate with the storage service 1310 via one or more communications channels to upload new or modified data from a local cache so that the primary store of data (the virtualized data store 1316) is maintained. In some embodiments, a user, via the virtual computing system 1392 and/or another customer device 1390, can mount and access virtual data store 1316 volumes via the storage service 1310 acting as a storage virtualization service, and these volumes can appear to the user as local (virtualized) storage 1398.

While not shown in FIG. 13, the virtualization service(s) can also be accessed from resource instances within the provider network 1300 via the API(s) 1302. For example, a customer, appliance service provider, or other entity can access a virtualization service from within a respective virtual network on the provider network 1300 via the API(s) 1302 to request allocation of one or more resource instances within the virtual network or within another virtual network.

Figure 14:
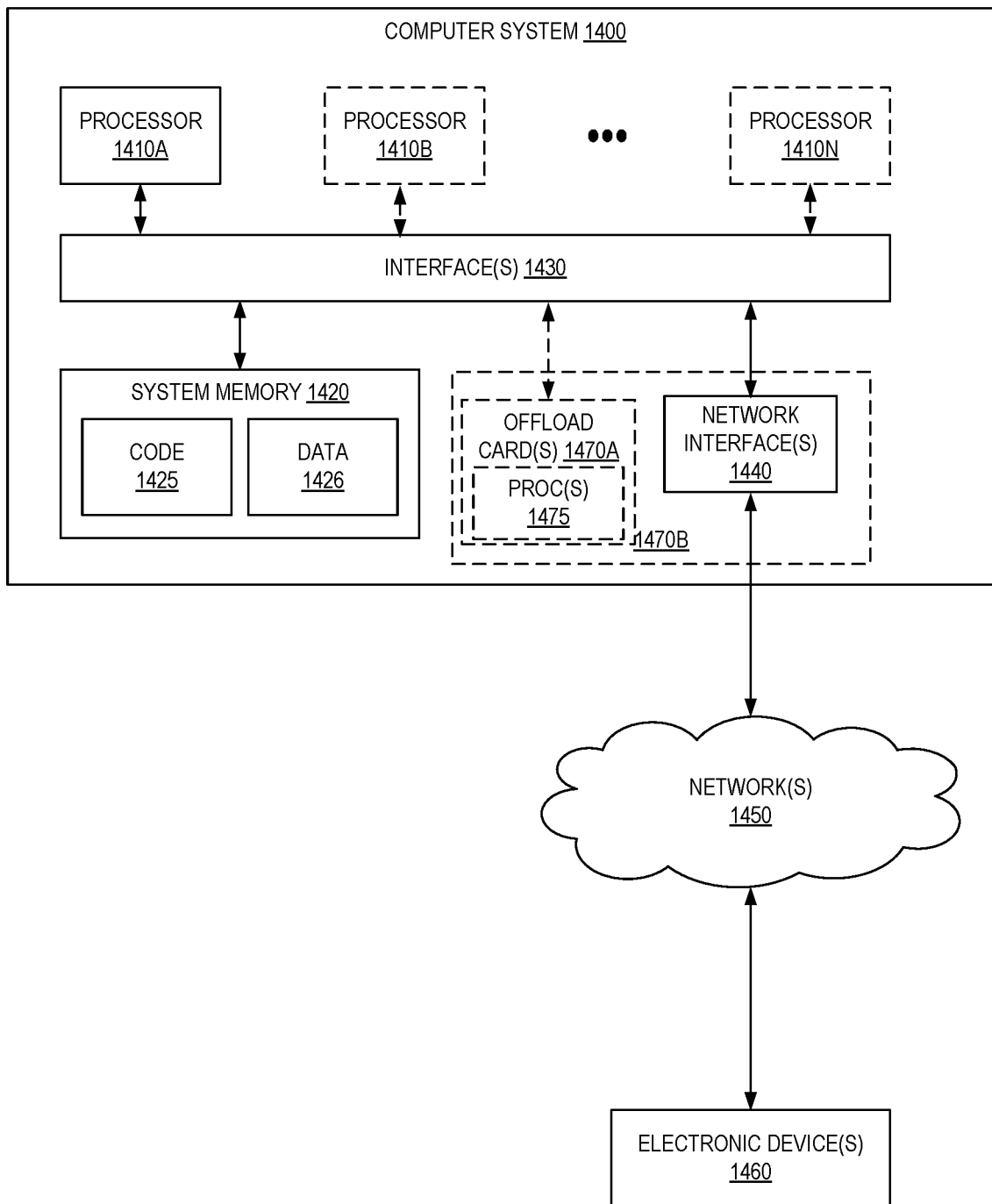
FIG. 14 is a block diagram illustrating an example computer system that can be used in some embodiments.

In some embodiments, a system that implements a portion or all of the techniques described herein can include a general-purpose computer system, such as the computer system 1400 illustrated in FIG. 14, that includes, or is configured to access, one or more computer-accessible media. In the illustrated embodiment, the computer system 1400 includes one or more processors 1410 coupled to a system memory 1420 via an input/output (I/O) interface 1430. The computer system 1400 further includes a network interface 1440 coupled to the I/O interface 1430. While FIG. 14 shows the computer system 1400 as a single computing device, in various embodiments the computer system 1400 can include one computing device or any number of computing devices configured to work together as a single computer system 1400.

In various embodiments, the computer system 1400 can be a uniprocessor system including one processor 1410, or a multiprocessor system including several processors 1410 (e.g., two, four, eight, or another suitable number). The processor(s) 1410 can be any suitable processor(s) capable of executing instructions. For example, in various embodiments, the processor(s) 1410 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1410 can commonly, but not necessarily, implement the same ISA.

The system memory 1420 can store instructions and data accessible by the processor(s) 1410. In various embodiments, the system memory 1420 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 1420 as code 1425 and data 1426. Code 1425 can include, for example, an executable to implement, in whole or in part, the components of the distributed data processing application service described herein. For example, the code 1425 can include an executable to implement the session manager service 110 (or a member of the session manager service 110 in the distributed case), a network manager service 112, and/or a resource manager service 114 (or a member of the resource manager service 114 in the distributed case). Exemplary executables further include those for the agents described herein (e.g., the agent 160, the agent 760), the application runtime for a distributed data processing tool, and so on.

In some embodiments, the I/O interface 1430 can be configured to coordinate I/O traffic between the processor 1410, the system memory 1420, and any peripheral devices in the device, including the network interface 1440 and/or other peripheral interfaces (not shown). In some embodiments, the I/O interface 1430 can perform any necessary protocol, timing, or other data transformations to convert data signals from one component (e.g., the system memory 1420) into a format suitable for use by another component (e.g., the processor 1410). In some embodiments, the I/O interface 1430 can include support for devices attached through various types of peripheral buses, such as a variant of the Peripheral Component Interconnect (PCI) bus standard or the Universal Serial Bus (USB) standard, for example. In some embodiments, the function of the I/O interface 1430 can be split into two or more separate components, such as a north bridge and a south bridge, for example. Also, in some embodiments, some or all of the functionality of the I/O interface 1430, such as an interface to the system memory 1420, can be incorporated directly into the processor 1410.

The network interface 1440 can be configured to allow data to be exchanged between the computer system 1400 and other devices 1460 attached to a network or networks 1450, such as other computer systems or devices as illustrated in FIG. 1, for example. In various embodiments, the network interface 1440 can support communication via any suitable wired or wireless general data networks, such as types of Ethernet network, for example. Additionally, the network interface 1440 can support communication via telecommunications/telephony networks, such as analog voice networks or digital fiber communications networks, via storage area networks (SANs), such as Fibre Channel SANs, and/or via any other suitable type of network and/or protocol.

In some embodiments, the computer system 1400 includes one or more offload cards 1470A or 1470B (including one or more processors 1475, and possibly including the one or more network interfaces 1440) that are connected using the I/O interface 1430 (e.g., a bus implementing a version of the Peripheral Component Interconnect-Express (PCI-E) standard, or another interconnect such as a Quick-Path interconnect (QPI) or UltraPath interconnect (UPI)). For example, in some embodiments the computer system 1400 can act as a host electronic device (e.g., operating as part of a hardware virtualization service) that hosts compute resources such as compute instances, and the one or more offload cards 1470A or 1470B execute a virtualization manager that can manage compute instances that execute on the host electronic device. As an example, in some embodiments the offload card(s) 1470A or 1470B can perform compute instance management operations, such as pausing and/or un-pausing compute instances, launching and/or terminating compute instances, performing memory transfer/copying operations, etc. In the context of the warm pool computer systems of a distributed data processing application service, the offload card(s) 1470 can execute the agent that manages virtual machines (e.g., agent 160, agent 760) executed by the other processor(s) (e.g., 1410) of the computer system 1400. These management operations can, in some embodiments, be performed by the offload card(s) 1470A or 1470B in coordination with a hypervisor (e.g., upon a request from a hypervisor) that is executed by the other processors 1410A-1410N of the computer system 1400. However, in some embodiments the virtualization manager implemented by the offload card(s) 1470A or 1470B can accommodate requests from other entities (e.g., from compute instances themselves), and can not coordinate with (or service) any separate hypervisor.

In some embodiments, the system memory 1420 can be one embodiment of a computer-accessible medium configured to store program instructions and data as described above. However, in other embodiments, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1400 via the I/O interface 1430. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of the computer system 1400 as the system memory 1420 or another type of memory. Further, a computer-accessible medium can include transmission media or signals such as electrical, electromagnetic, or digital signals, conveyed via a communication medium such as a network and/or a wireless link, such as can be implemented via the network interface 1440.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1318A-1318N) can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

The specification and drawings are, accordingly, to be regarded in an illustrative rather than a restrictive sense. It will, however, be evident that various modifications and changes can be made thereunto without departing from the broader spirit and scope of the disclosure as set forth in the claims.

What is claimed is:

1. A computer-implemented method comprising:
by an agent of a computer system in a pool of computer systems of a distributed data processing application service of a provider network:
obtaining a virtual machine bundle, the virtual machine bundle including a copy of a memory and one or more registers of a paused virtual machine executing a distributed data processing application runtime;
storing the virtual machine bundle in a local storage device of the computer system;
receiving a request to launch a virtual machine to execute a distributed data processing application runtime, the request including a bundle identifier that identifies the virtual machine bundle, a session network identifier that identifies a network of a cluster of virtual machines hosted by the provider network, and an executor identifier to identify the virtual machine launched in response to the request;
determining that the computer system has sufficient resources to satisfy the request to launch a virtual machine to execute the virtual machine;
launching the virtual machine based at least in part on the virtual machine bundle stored in the local storage device;
assigning an internet protocol (IP) address to the virtual machine based at least in part on the session network identifier; and
sending, from the virtual machine, a message including the executor identifier to register the virtual machine with the cluster of virtual machines hosted by the provider network.

2. The computer-implemented method of claim 1, further comprising:
by a session manager service of the provider network:
receiving the message including the executor identifier from the virtual machine, the message identifying an internet protocol address of the virtual machine;
determining a session identifier that identifies the cluster of virtual machines based at least in part on a portion of the internet protocol address that includes the session network identifier; and
updating session metadata to associate an identification of the virtual machine with the session identifier.

3. The computer-implemented method of claim 2, further comprising, by the session manager service of the provider network and after receiving the message including the executor identifier from the virtual machine, sending a calculation to the virtual machine, the calculation to be performed by the distributed data processing application runtime executed by the virtual machine.

4. A computer-implemented method comprising:
by an agent of a computer system in a pool of computer systems of a distributed data processing application service:
obtaining a virtual machine bundle, the virtual machine bundle including a copy of a memory and one or more registers of a paused virtual machine executing a distributed data processing application runtime;
receiving a request to launch a virtual machine to execute a distributed data processing application runtime, the request to launch the virtual machine including a bundle identifier that identifies the virtual machine bundle;
launching the virtual machine based at least in part on the virtual machine bundle; and
sending, from the virtual machine, a message to register the virtual machine with a cluster of virtual machines.

5. The computer-implemented method of claim 4, further comprising, by a session manager service:
receiving the message to register the virtual machine from the virtual machine; and
updating session metadata to associate an identification of the virtual machine with a session identifier that identifies the cluster of virtual machines.

6. The computer-implemented method of claim 5, further comprising, by the session manager service, sending a calculation to the virtual machine, the calculation to be performed by the distributed data processing application runtime executed by the virtual machine.

7. The computer-implemented method of claim 5, wherein the request to launch the virtual machine further includes a session network identifier that identifies a network of the cluster of virtual machines, and further comprising, by the agent of a computer system, assigning an internet protocol (IP) address to the virtual machine based at least in part on the session network identifier.

8. The computer-implemented method of claim 7, wherein the request to launch the virtual machine further includes the session identifier that identifies the cluster of virtual machines, and, further comprising, by the virtual machine:
   sending, to the session manager service, a request to add a new member to the cluster of virtual machines, the request including the session identifier; and
   receiving, from the session manager service, an identification of a new cluster member launched in response to the request.

9. The computer-implemented method of claim 4, wherein launching the virtual machine comprises resuming the paused virtual machine executing the distributed data processing application runtime.

10. The computer-implemented method of claim 4, further comprising, by the agent of the computer system, creating a jail within which to host the virtual machine, and wherein the virtual machine is launched within the jail.

11. The computer-implemented method of claim 4 wherein at least a portion of the bundle is stored in a local storage device of the computer system.

12. The computer-implemented method of claim 4, wherein the virtual machine bundle includes an indication of an amount of memory and an indication of a number of virtual central processing units to allocate to the virtual machine, and further comprising, by the agent of the computer system:
   determining that an available amount of memory of the computer system meets or exceeds the indication of the amount of memory to allocate to the virtual machine; and
   determining that an available amount of compute capacity of the computer system meets or exceeds the indication of the number of virtual processing units to allocate to the virtual machine.

13. A system comprising:
   a first one or more electronic devices to implement a session manager service of a distributed data processing application service; and
   a second one or more electronic devices of a computer system in a pool of computer systems of the distributed data processing application service of the provider network, the second one or more electronic devices including instructions that upon execution cause the computer system to:
     obtain a virtual machine bundle, the virtual machine bundle including a copy of a memory and one or more registers of a paused virtual machine executing a distributed data processing application runtime;
     receive a request to launch a virtual machine to execute a distributed data processing application runtime, the request to launch the virtual machine including a bundle identifier that identifies the virtual machine bundle;
     launch the virtual machine based at least in part on the virtual machine bundle; and
     send, from the virtual machine to the session manager service, a message to register the virtual machine with a cluster of virtual machines.

14. The system of claim 13, wherein the first one or more electronic devices include instructions that upon execution cause the session manager service to:
   receive the message to register the virtual machine from the virtual machine; and
   update session metadata to associate an identification of the virtual machine with a session identifier that identifies the cluster of virtual machines.

15. The system of claim 14, wherein the first one or more electronic devices include further instructions that upon execution cause the session manager service to send a calculation to the virtual machine, the calculation to be performed by the distributed data processing application runtime executed by the virtual machine.

16. The system of claim 14, wherein the request to launch the virtual machine further includes a session network identifier that identifies a network of the cluster of virtual machines, and wherein the second one or more electronic devices include further instructions that upon execution cause the computer system to assign an internet protocol (IP) address to the virtual machine based at least in part on the session network identifier.

17. The system of claim 16, wherein the request to launch the virtual machine further includes the session identifier that identifies the cluster of virtual machines, and wherein the second one or more electronic devices include further instructions that upon execution cause the computer system to:
   send, to the session manager service, a request to add a new member to the cluster of virtual machines, the request including the session identifier; and
   receive, from the session manager service, an identification of a new cluster member launched in response to the request.

18. The system of claim 13, wherein launching the virtual machine comprises resuming the paused virtual machine executing the distributed data processing application runtime.

19. The system of claim 13, wherein the second one or more electronic devices include further instructions that upon execution cause the computer system to create a jail within which to host the virtual machine, and wherein the virtual machine is launched within the jail.

20. The system of claim 13, wherein the second one or more electronic devices include further instructions that upon execution cause the computer system to:
   obtain a manifest that identifies one or more bundles to be stored in a local storage device of the second one or more electronic devices of the computer system;
   delete a first bundle not identified in the manifest from the local storage device;
   download at least a portion of a second bundle identified in the manifest from a bundle manager service; and
   store the at least the portion of the second bundle in the local storage device.

* * * * *